United States Patent
Tochino et al.

(10) Patent No.: US 12,191,985 B2
(45) Date of Patent: Jan. 7, 2025

(54) COMMUNICATION CONTROL DEVICE, COMMUNICATION METHOD, COMMUNICATION SYSTEM AND COMMUNICATION PROGRAM

(71) Applicant: NIPPON TELEGRAPH AND TELEPHONE CORPORATION, Tokyo (JP)

(72) Inventors: Takamitsu Tochino, Musashino (JP); Hirotaka Ujikawa, Musashino (JP); Hirotaka Nakamura, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 71 days.

(21) Appl. No.: 17/923,895

(22) PCT Filed: May 18, 2020

(86) PCT No.: PCT/JP2020/019642
§ 371 (c)(1),
(2) Date: Nov. 7, 2022

(87) PCT Pub. No.: WO2021/234778
PCT Pub. Date: Nov. 25, 2021

(65) Prior Publication Data
US 2023/0188240 A1 Jun. 15, 2023

(51) Int. Cl.
*H04J 3/08* (2006.01)
*H04B 10/275* (2013.01)

(52) U.S. Cl.
CPC ............ *H04J 3/085* (2013.01); *H04B 10/275* (2013.01)

(58) Field of Classification Search
CPC .............................. H04B 10/275; H04J 3/085
(Continued)

(56) References Cited

U.S. PATENT DOCUMENTS 9,642,133 B2 * 5/2017 Shibuta ............. H04W 72/0446
2012/0224492 A1 * 9/2012 Kitayama ............. H04L 12/403
370/242
2015/0131991 A1 * 5/2015 Hattori ............... H04Q 11/0005
398/47

FOREIGN PATENT DOCUMENTS

| JP | 2014160920 A | 9/2014 |
| JP | 201676859 A | 5/2016 |
| JP | 2016119562 A | 6/2016 |

OTHER PUBLICATIONS

Yohei Sakamaki et al., Optical switch technology that realizes a more flexible optical node, NTT Technical Journal, vol. 25, No. 11, 2013, pp. 16-20, https://www.ntt.co.jp/journal/1311/files/jn201311016.pdf.

* cited by examiner

*Primary Examiner* — Dalzid E Singh
(74) *Attorney, Agent, or Firm* — Harness, Dickey & Pierce, P.L.C.

(57) ABSTRACT

There is provided a communication method used in a communication system in which a plurality of communication apparatuses is connected by an optical ring network, the communication method including: setting one of the plurality of communication apparatuses as a master communication apparatus and the other communication apparatuses as slave communication apparatuses, causing the master communication apparatus to transmit an optical signal at transmission timing determined in the master communication apparatus; causing the master communication apparatus to transmit an assignment signal for assigning, to the slave communication apparatuses, transmission timing at which an optical signal on at least one wavelength is time-division multiplexed and transmitted; and causing the slave communication apparatuses to transmit an optical signal to the (Continued)

optical ring network based on transmission timing assigned by the assignment signal received from the master communication apparatus. As a result, the number of wavelengths needed for communication is reduced, and even when communication paths increases due to an increase in the number of optical transmission apparatuses, there is no need to increase the number of wavelengths, thereby solving the problem in economic efficiency.

10 Claims, 12 Drawing Sheets

(58) Field of Classification Search
USPC .......................................................... 398/102
See application file for complete search history.

COMMUNICATION CONTROL DEVICE, COMMUNICATION METHOD, COMMUNICATION SYSTEM AND COMMUNICATION PROGRAM

CROSS-REFERENCE TO RELATED APPLICATIONS

This application is a 371 U.S. National Phase of International Application No. PCT/JP2020/019642, filed on May 18, 2020. The entire disclosures of the above applications are incorporated herein by reference.

TECHNICAL FIELD

The present invention relates to a technique for reducing the number of wavelengths of an optical signal used for communication in an optical ring network constituting a communication system.

BACKGROUND ART

FIG. 11 illustrates an example of a conventional optical ring network system 800. In the example in FIG. 11, optical transmission apparatuses 801-A to 801-D are connected to an optical ring network 802 configured with optical fibers, and multiplexed optical signals are transmitted over a plurality of wavelengths $\lambda_1$ to $\lambda_n$ ($\lambda_1$ to n). The optical transmission apparatuses 801-A, 801-B, 801-C, and 801-D (referred to as the optical transmission apparatus 801) acquire optical signals on wavelengths $\lambda_1, \lambda_2, \lambda_3,$ and $\lambda_4$ allocated to the respective apparatuses by using an optical add-drop multiplexer (OADM) technique (refer to NPL 1, for example). In this way, external NWs 803-A, 803-B, 803-C, and 803-D can communicate with each other via their respective optical transmission apparatuses 801.

FIG. 12 illustrates an example of the optical transmission apparatus 801 illustrated in FIG. 11. In the example in FIG. 12, the optical transmission apparatus 801 includes an optical demultiplexing unit 901, an optical multiplexing unit 902, an optical reception unit (Rx) 903, an optical transmission unit (Tx) 904, a layer-1 processing unit (L1 unit) 905, a layer-2 processing unit (L2 unit) 906, and a switch (SW) unit 907. Communication among a plurality of optical transmission apparatuses 801 connected by the optical ring network 802 is performed at each wavelength preset in the optical demultiplexing unit 901 and the optical multiplexing unit 902. The optical demultiplexing unit 901 has a function of separating an optical signal on a wavelength (for example, $\lambda_k$) set for communication of its own apparatus from optical signals on the other wavelengths ($\lambda_{1\ to\ K-1}$ and $\lambda_{K+1\ to\ n}$) among optical signals on a plurality of wavelengths ($\lambda_1$ to n) input from a connected optical fiber of the optical ring network 802. The optical multiplexing unit 902 has a function of multiplexing the input optical signals on a plurality of wavelengths. The Rx 903 has a function of transferring optical signals continuously received by the Rx 903 to the L1 unit 905 as data signals. The Tx 904 has a function of continuously outputting data signals transferred from the L1 unit 905 as optical signals. The L1 unit 905 has a function of processing the first layer of an open system interconnection (OSI) reference model. The L2 unit 906 has a function of processing the second layer of the OSI reference model. The SW unit 907 is an electric packet switch such as an L2-SW connected to an external NW 803 and has a function of processing packet transfer between the L2 unit 906 and the external NW 803 in accordance with preset rules.

CITATION LIST

Non Patent Literature

[NPL 1] Sakamaki, et al., "Optical Switch Technologies for Realizing More Flexible Optical Node", NTT Technical Journal, November 2013. (https://www.ntt.co.jp/journal/1311/files/jn201311016.pdf)

SUMMARY OF THE INVENTION

Technical Problem

As described above, the conventional optical ring network system 800 employs the OADM technique, for example, as described in NPL 1, and as the number of communication paths among the optical transmission apparatuses 801 increases, the number of wavelengths of optical signals needs to be increased, which is economically inefficient.

It is an object of the present invention to provide a communication apparatus, a communication method, a communication system, and a communication program capable of solving the problem in economic efficiency in the prior art by performing communication among all optical transmission apparatuses in an optical ring network by means of time division multiplexing of at least one wavelength, thereby eliminating the need to increase the number of wavelengths even when the number of communication paths increases due to an increase in the number of optical transmission apparatuses connected to the optical ring network.

Means for Solving the Problem

The present invention provides a communication method used in a communication system in which a plurality of communication apparatuses is connected by an optical ring network, the communication method including: setting one of the plurality of communication apparatuses as a master communication apparatus and the other communication apparatuses as slave communication apparatuses, causing the master communication apparatus to transmit an optical signal at transmission timing determined in the master communication apparatus; causing the master communication apparatus to transmit an assignment signal for assigning, to the plurality of slave communication apparatuses, transmission timing at which an optical signal on at least one wavelength is time-division multiplexed and transmitted; and causing the slave communication apparatuses to transmit an optical signal to the optical ring network based on transmission timing assigned by the assignment signal received from the master communication apparatus.

In addition, the present invention provides a communication apparatus including: a communication unit that is connected to an optical ring network and that transmits or receives an optical signal via the optical ring network; and a control unit that controls transmission timing of an optical signal, wherein, when the communication apparatus is a master communication apparatus, the control unit transmits an optical signal at transmission timing determined in the communication apparatus and transmits, from the communication unit to the optical ring network, an assignment signal for assigning transmission timing at which an optical signal on at least one wavelength is time-division multiplexed and transmitted, to the other communication apparatuses serving as slave communication apparatuses connected to the optical ring network, and wherein, when the communication apparatus is one of the slave communication apparatuses, the control unit transmits an optical signal from the communication unit to the optical ring network, based on transmission timing assigned by the assignment signal received from the master communication apparatus.

In addition, the present invention provides a communication system in which a plurality of communication apparatuses is connected by an optical ring network, the communication system including: setting one of the plurality of communication apparatuses as a master communication apparatus and the other communication apparatuses as slave communication apparatuses, wherein the master communication apparatus transmits an optical signal at transmission timing determined in the master communication apparatus and transmits an assignment signal for assigning, to the slave communication apparatuses, transmission timing at which an optical signal on at least one wavelength is time-division multiplexed and transmitted, and wherein the slave communication apparatus transmits an optical signal to the optical ring network, based on transmission timing assigned by the assignment signal received from the master communication apparatus.

In addition, the present invention provides a communication program that causes a computer or an integrated circuit to execute processing performed by the control unit of the communication apparatus.

Effects of the Invention

According to the communication apparatus, the communication method, the communication system, and the communication program of the present invention, communication among all optical transmission apparatuses in an optical ring network is performed by means of time division multiplexing of at least one wavelength, thereby eliminating the need to increase the number of wavelengths even when the number of communication paths increases due to an increase in the number of optical transmission apparatuses connected to the optical ring network. Thus, the problem in economic efficiency in the prior art can be solved.

DESCRIPTION OF EMBODIMENTS

Hereinafter, embodiments of a communication apparatus, a communication method, a communication system, and a communication program according to the present invention will be described with reference to the drawings. In each embodiment described below, an optical ring network system (corresponding to a communication system) in which a plurality of optical transmission apparatuses (corresponding to communication apparatuses) is connected by the optical ring network.

First Embodiment

Figure 1:
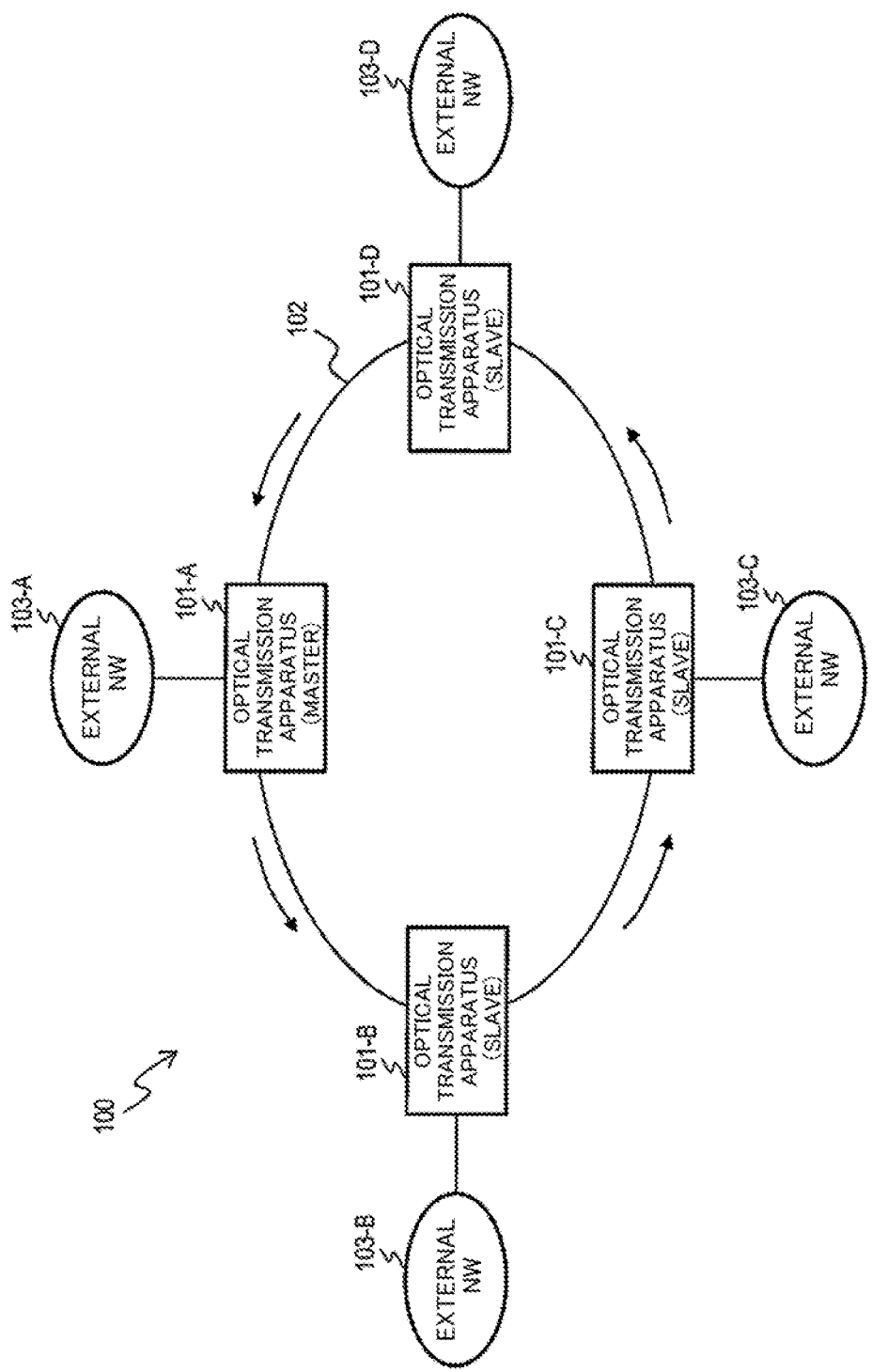
FIG. 1 illustrates an example of an optical ring network system according to a first embodiment.

FIG. 1 illustrates an example of an optical ring network system 100 according to a first embodiment.

In the example in FIG. 1, an optical transmission apparatus 101-A, an optical transmission apparatus 101-B, an optical transmission apparatus 101-C, and an optical transmission apparatus 101-D are connected by a ring-type network (optical ring network 102) configured with optical fibers. Further, an external network (NW) 103 is connected to each of the optical transmission apparatuses 101, and communication among different external NWs 103 can be performed. The external NW 103 is a network connected to the above-described optical ring network system, and a NW apparatus is connected to the external NW 103. In the present embodiment, communication among all the optical transmission apparatuses 101 is performed on the optical ring network 102 by time division multiplexing (optical time division multiple access (TDMA)) of an optical signal on at least one wavelength.

Here, when description common to the optical transmission apparatus 101-A, the optical transmission apparatus 101-B, the optical transmission apparatus 101-C, and the optical transmission apparatus 101-D is given, the alphabet at the end of reference characters is omitted, and the apparatus is denoted by the optical transmission apparatus 101. When a specific apparatus is indicated, a corresponding alphabet is added to the end of the reference characters, and the apparatus is denoted by, for example, the optical transmission apparatus 101-A.

The optical ring network system 100 according to the present embodiment sets one of the plurality of optical transmission apparatuses 101 as a master apparatus and the other one or more of optical transmission apparatuses 101 as slave apparatuses. The optical transmission apparatus 101 serving as the master apparatus controls transmission timing of optical signals transmitted by the plurality of optical transmission apparatuses 101 serving as the slave apparatuses. In the example in FIG. 1, the optical transmission apparatus 101-A operates as a master apparatus (indicated as the optical transmission apparatus (master) 101-A), and the optical transmission apparatuses 101-B to 101-D operate as slave apparatuses (indicated as the optical transmission apparatus (slave) 101-B to the optical transmission apparatus (slave) 101-D). In the following description, when description common to the slave apparatuses, which are the optical transmission apparatus (slave) 101-B to the optical transmission apparatus (slave) 101-D, is given, the apparatus is denoted by the optical transmission apparatus (slave) 101. Further, each of the plurality of optical transmission apparatuses 101 has the same configuration, and any one of the optical transmission apparatuses 101 may serve as a master apparatus. However, in the present embodiment, the master apparatus is determined in advance by a system operator, and the optical transmission apparatus 101-A is assumed to be determined as a master apparatus.

In FIG. 1, the optical transmission apparatus (master) 101-A in the optical ring network 102 transmits transmission timing of an optical signal to each of the other optical transmission apparatuses 101 (the optical transmission apparatuses (slaves) 101-B to 101-D) to control these apparatuses. The optical transmission apparatuses (slaves) 101-B to 101-D transmit optical signals at their respective timings assigned by the optical transmission apparatus (master) 101-A.

In addition, the optical transmission apparatus (master) 101-A registers (adds) a new optical transmission apparatus (slave) 101 or deletes a registered optical transmission apparatus (slave) 101 by transmitting a search signal to search for such an optical transmission apparatus (slave) 101 during a period in which a data communication sequence is not performed. In this way, communication among all the optical transmission apparatuses 101 can be achieved by optical TDMA on at least one wavelength. Thus, even when the number of communication paths increases due to an increase in the number of optical transmission apparatuses 101 newly connected to the optical ring network 102, the problem in economic efficiency in the prior art can be solved.

(Configuration Example of Optical Transmission Apparatus (Master) 101-A)

Next, the optical transmission apparatus (master) 101-A will be described.

Figure 2:
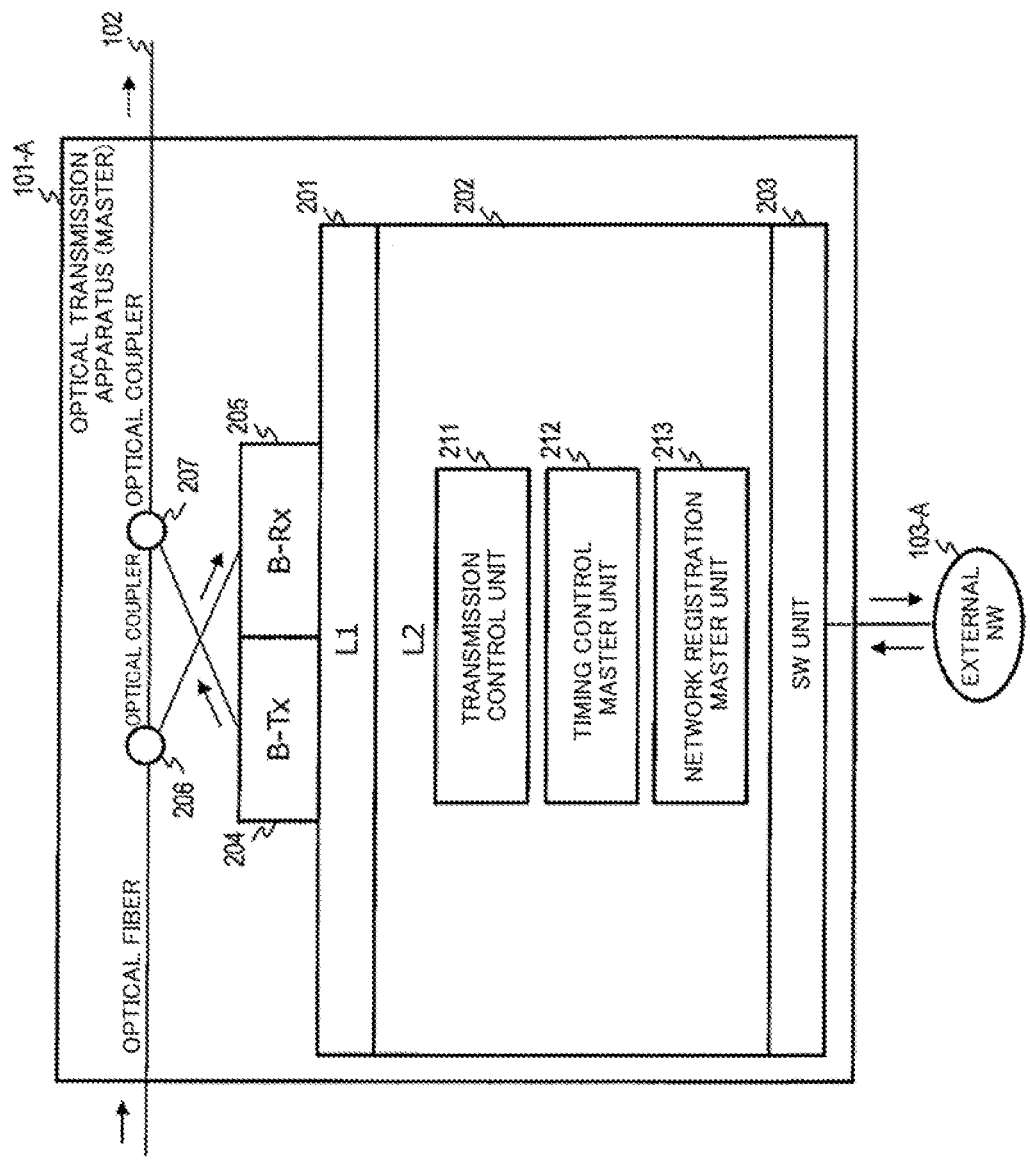
FIG. 2 illustrates an example of an optical transmission apparatus (master) according to the first embodiment.

FIG. 2 illustrates a configuration example of the optical transmission apparatus (master) 101-A. In FIG. 2, the optical transmission apparatus (master) 101-A includes a layer-1 processing unit (L1 unit) 201, a layer-2 processing unit (L2 unit) 202, a switch unit (SW unit) 203, an optical transmission unit (B-Tx unit) 204, an optical reception unit (B-Rx unit) 205, an optical coupler 206, and an optical coupler 207. Further, the L2 unit 202 includes a transmission control unit 211, a timing control master unit 212, and a network registration master unit 213.

The L1 unit 201 has a function of processing the first layer (physical layer) of an OSI reference model.

The L2 unit 202 has a function of processing the second layer (data link layer) of the OSI reference model.

The SW unit 203 is an electric packet switch such as an L2-SW connected to an external NW 103-A and has a function of processing packet transfer between the L2 unit 202 and the external NW 103 in accordance with preset rules.

The B-Tx unit 204 is a transmission unit that intermittently outputs optical signals. The B-Tx unit 204 transmits signals transferred from the L1 unit 201 as optical signals in a burst manner to an optical fiber via the optical coupler in accordance with an instruction from the transmission control unit, which will be described below.

The B-Rx unit 205 is a reception unit that receives intermittent optical signals. The B-Rx unit 205 receives optical signals in a burst manner from an optical fiber via the optical coupler and transfers the received signals to the L1 unit 201. The B-Tx unit 204 and the B-Rx unit 205 correspond to a communication unit.

The optical coupler 206 and the optical coupler 207 have a function of branching the power of input optical signals.

Further, in the L2 unit 202, the transmission control unit 211 instructs the B-Tx unit 204 to transmit an optical signal in accordance with an instruction from the timing control master unit 212 or a timing control slave unit 312 of each of the optical transmission apparatuses (slaves) 101-B to 101-D, which will be described below.

The timing control master unit 212 has a function of determining transmission timing of all the optical transmission apparatuses 101 connected to the optical ring network 102 including its own apparatus and providing instructions about time point to transmit and how long to transmit the optical signal, to the transmission control unit 211 of its own apparatus (or the transmission control unit 311 of the slave apparatus). Instructions to the optical transmission apparatuses 101 other than the own apparatus are provided through the communication realized by each of the L1 unit 201, the L2 unit 202, the B-Tx unit 204, and the B-Rx unit 205.

The network registration master unit 213 performs an initial connection sequence with the optical transmission apparatus (slave) 101 to detect an unregistered optical transmission apparatus (slave) 101 connected to the optical ring network 102 and register the unregistered optical transmission apparatus (slave) 101 with the optical ring network system 100. Specifically, the network registration master unit 213 transmits a search signal to search for an unregistered optical transmission apparatus 101 that is newly connected. When receiving a registration request signal from an optical transmission apparatus (slave) 101 that has responded to the search signal, the network registration master unit 213 performs registration processing for registering this optical transmission apparatus (slave) 101 as an apparatus connected to the optical ring network 102 and transmits a registration notification signal to this optical transmission apparatus (slave) 101.

In this way, the optical transmission apparatus (master) 101-A registers an unregistered optical transmission apparatus (slave) 101 and assigns timing at which the registered optical transmission apparatus (slave) 101 transmits an optical signal to the optical ring network 102. Thus, communication among all the optical transmission apparatuses 101 in the optical ring network 102 can be performed by optical TDMA on at least one wavelength. Accordingly, the number of wavelengths needed is reduced, and even when the number of communication paths increases due to an increase in the number of optical transmission apparatuses 101 connected to the optical ring network 102, there is no need to increase the number of wavelengths, thereby solving the problem in economic efficiency in the prior art.

In the present embodiment, the case where a registration request signal is received from an unregistered optical transmission apparatus 101 is described. However, all optical transmission apparatuses 101 that have received the search signal may return a registration request signal, regardless of the presence or absence of registration. In this way, when the network registration master unit 213 receives no registration request signal from the optical transmission apparatus 101 that has been registered in the past, after detecting disconnection of this optical transmission apparatus 101 from the optical ring network 102, the network registration master unit 213 can delete the corresponding registration. However, in this case, to avoid collision of a plurality of registration request signals returned from all the optical transmission apparatuses 101, transmission timing needs to be controlled, which will be described below.

(Configuration Example of Optical Transmission Apparatus (Slave) 101-B)

Next, the optical transmission apparatus (slave) 101-B will be described. While the optical transmission apparatus (slave) 101-B will be described here, the same configuration applies to the other optical transmission apparatuses (slaves) 101-C and 101-D.

Figure 3:
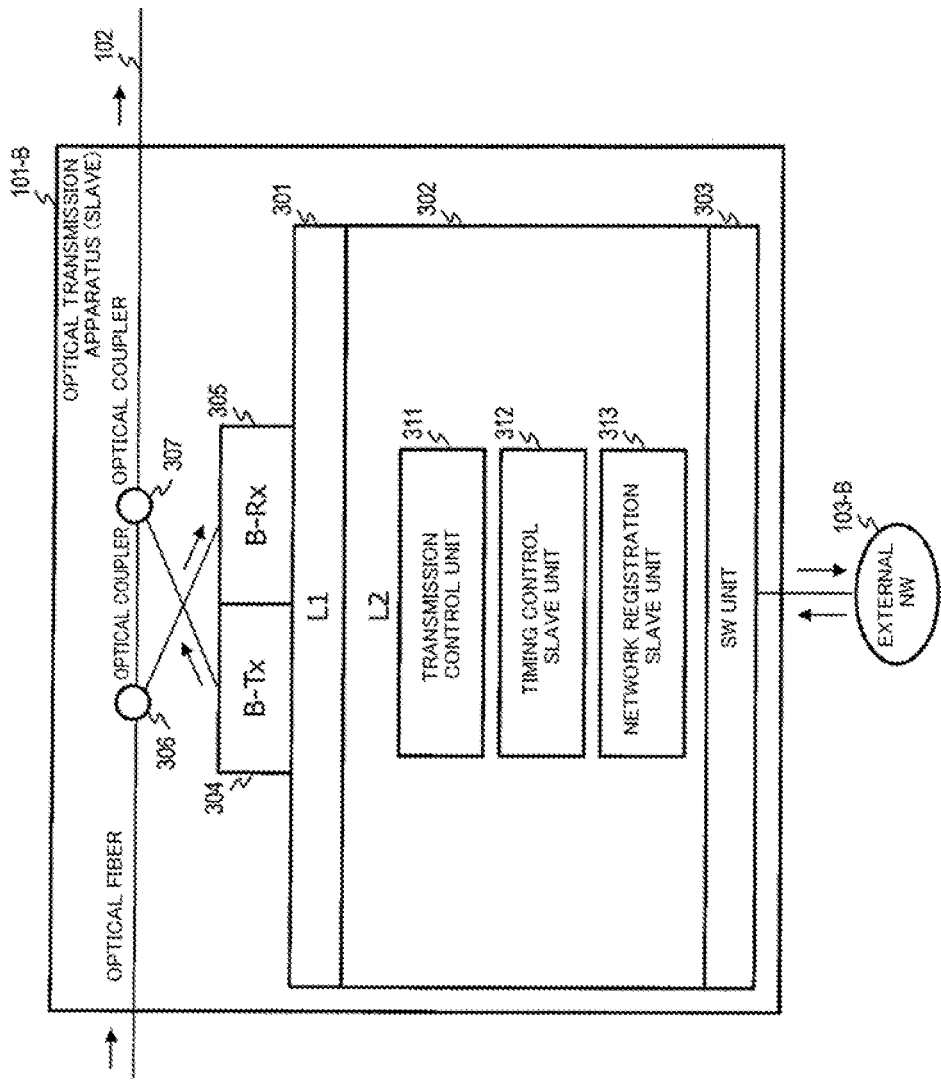
FIG. 3 illustrates an example of an optical transmission apparatus (slave) according to the first embodiment.

FIG. 3 illustrates a configuration example of the optical transmission apparatus (slave) 101-B. In FIG. 3, the optical transmission apparatus (slave) 101-B includes a layer-1 processing unit (L1 unit) 301, a layer-2 processing unit (L2 unit) 302, a switch unit (SW unit) 303, an optical transmission unit (B-Tx unit) 304, an optical reception unit (B-Rx unit) 305, an optical coupler 306, and an optical coupler 307. Further, the L2 unit 302 includes a transmission control unit 311, a timing control slave unit 312, and a network registration slave unit 313.

The L1 unit 301, which corresponds to the L1 unit 201 of the optical transmission apparatus (master) 101-A, has a function of processing the first layer (physical layer) of the OSI reference model.

The L2 unit 302, which corresponds to the L2 unit 202 of the optical transmission apparatus (master) 101-A, has a function of processing the second layer (data link layer) of the OSI reference model.

The SW unit 303, which corresponds to the SW unit 203 of the optical transmission apparatus (master) 101-A, is an electric packet switch such as an L2-SW connected to an external NW 103 and has a function of processing packet transfer between the L2 unit 302 and the external NW 103-B in accordance with preset rules.

The B-Tx unit 304, which corresponds to the B-Tx unit 204 of the optical transmission apparatus (master) 101-A, is a transmission unit that intermittently outputs optical signals and transmits signals transferred from the L1 unit 301 as optical signals in a burst manner to an optical fiber via the optical coupler in accordance with an instruction from the transmission control unit 311, which will be described below.

The B-Rx unit 305, which corresponds to the B-Rx unit 205 of the optical transmission apparatus (master) 101-A, is a reception unit that receives intermittent optical signals, receives optical signals in a burst manner from an optical fiber via the optical coupler, and transfers the received signals to the L1 unit 301. The B-Tx unit 304 and the B-Rx unit 305 correspond to a communication unit.

The optical coupler 306 and the optical coupler 307 correspond to the optical coupler 206 and the optical coupler 207 of the optical transmission apparatus (master) 101-A, respectively, and have a function of branching the power of input optical signals.

Further, in the L2 unit 302, the transmission control unit 311 causes the B-Tx unit 304 to transmit an optical signal in accordance with an instruction from the timing control slave unit 312.

The timing control slave unit 312 instructs the transmission control unit 311 to transmit an optical signal in accordance with the time point and the transmission time interval instructed by the timing control master unit 212.

When the network registration slave unit 313 receives a search signal from the optical transmission apparatus (master) 101-A, the network registration slave unit 313 transmits a registration request signal to the optical transmission apparatus (master) 101-A and receives a registration notification signal transmitted from the optical transmission apparatus (master) 101-A that has received the registration request signal. Here, as described above in the description of the optical transmission apparatus (master) 101-A, the optical transmission apparatus (slave) 101 may return a registration request signal when the own apparatus is unregistered, or all the optical transmission apparatuses 101 that have received the search signal may return a registration request signal regardless of the presence or absence of registration.

As described above, the optical transmission apparatus (slave) 101-B controls transmission of optical signals based on the transmission timing received from the optical transmission apparatus (master) 101-A. Further, data received from the external NW 103-A is transmitted to the optical fiber of the optical ring network 102 as optical signals in a burst manner, and data received from the optical fiber in a burst manner is transferred to the external NW 103.

As described above with reference to FIGS. 2 and 3, in the optical ring network system 100 according to the present embodiment, the optical transmission apparatus (master) 101-A controls optical signal transmission timing of the plurality of optical transmission apparatuses (slaves) 101. The optical transmission apparatus (master) 101-A itself also transmits an optical signal at the transmission timing determined in the own apparatus. In this way, communication among all the optical transmission apparatuses 101 in the optical ring network 102 can be performed by optical TDMA on at least one wavelength. Accordingly, the number of wavelengths needed is reduced, and even when the number of communication paths increases due to an increase in the number of optical transmission apparatuses 101 connected to the optical ring network 102, there is no need to increase the number of wavelengths, thereby solving the problem in economic efficiency in the prior art.

(Data Communication Sequence)

Next, a data communication sequence performed in the optical ring network system 100 described with reference to FIG. 1 will be described. Here, as an initial state, it is assumed that the optical transmission apparatus (master) 101-A and three optical transmission apparatuses (slaves) 101, which are the optical transmission apparatus (slave) 101-B, the optical transmission apparatus (slave) 101-C, and the optical transmission apparatus (slave) 101-D, are connected to the optical ring network 102, and all the optical transmission apparatuses (slaves) 101 are registered with the optical transmission apparatus (master) 101-A as apparatuses using the optical ring network system 100.

In the initial state, before starting the data communication sequence, the optical transmission apparatus (master) 101-A determines data transmission start time point and data transmission time interval of each of the optical transmission apparatuses 101 including the own apparatus in advance by using a predetermined algorithm. For example, the data transmission start time point and the data transmission time interval can be determined by using a well-known algorithm such as Dynamic Bandwidth Allocation (DBA) or Fixed Bandwidth Allocation (FBA) used for a Passive Optical Network (PON).

The optical transmission apparatus (master) 101-A, the optical transmission apparatus (slave) 101-B, the optical transmission apparatus (slave) 101-C, and the optical transmission apparatus (slave) 101-D registered as apparatuses that use the optical ring network system 100 periodically execute the data communication sequence.

When the data communication sequence is started, the optical transmission apparatus (master) 101-A causes the timing control master unit 212 to notify each of the optical transmission apparatuses 101 including the own apparatus with the corresponding transmission start time point and transmission time interval of an optical signal.

The transmission control unit 211 of the optical transmission apparatus (master) 101-A transmits an optical signal to the optical ring network 102 at the time specified by the timing control master unit 212. The optical signal transmitted from the optical transmission apparatus (master) 101-A to the optical ring network 102 is sequentially received by the optical transmission apparatus (slave) 101-B, the optical transmission apparatus (slave) 101-C, and the optical transmission apparatus (slave) 101-D.

Each of the optical transmission apparatuses (slaves) 101 monitors a unique identifier, such as a MAC address of Ethernet (registered trademark) or a logical link identifier (LLID) of a PON, of the received optical signal. Next, each of the optical transmission apparatuses (slaves) 101 identifies data addressed to the own apparatus based on the unique identifier and transfers only data addressed to the own apparatus to the SW unit 303. The transmission control unit 211 of the optical transmission apparatus (master) 101-A transmits the optical signal for the transmission time interval instructed by the timing control master unit 212 and then ends the transmission of the optical signal.

Next, the optical transmission apparatus (slave) 101-B transmits an optical signal based on the transmission start time point and transmission time interval notified from the optical transmission apparatus (master) 101-A to the timing control slave unit 312 of the own apparatus. Likewise, each of the optical transmission apparatus (slave) 101-C and the optical transmission apparatus (slave) 101-D transmits an optical signal based on the corresponding transmission start time point and transmission time interval of an optical signal notified from the optical transmission apparatus (master) 101-A to the timing control slave unit 312 of the own apparatus.

By repeating the above-described data communication sequence, data communication is performed among the optical transmission apparatuses 101 registered as apparatuses that use the optical ring network system 100.

Figure 4:
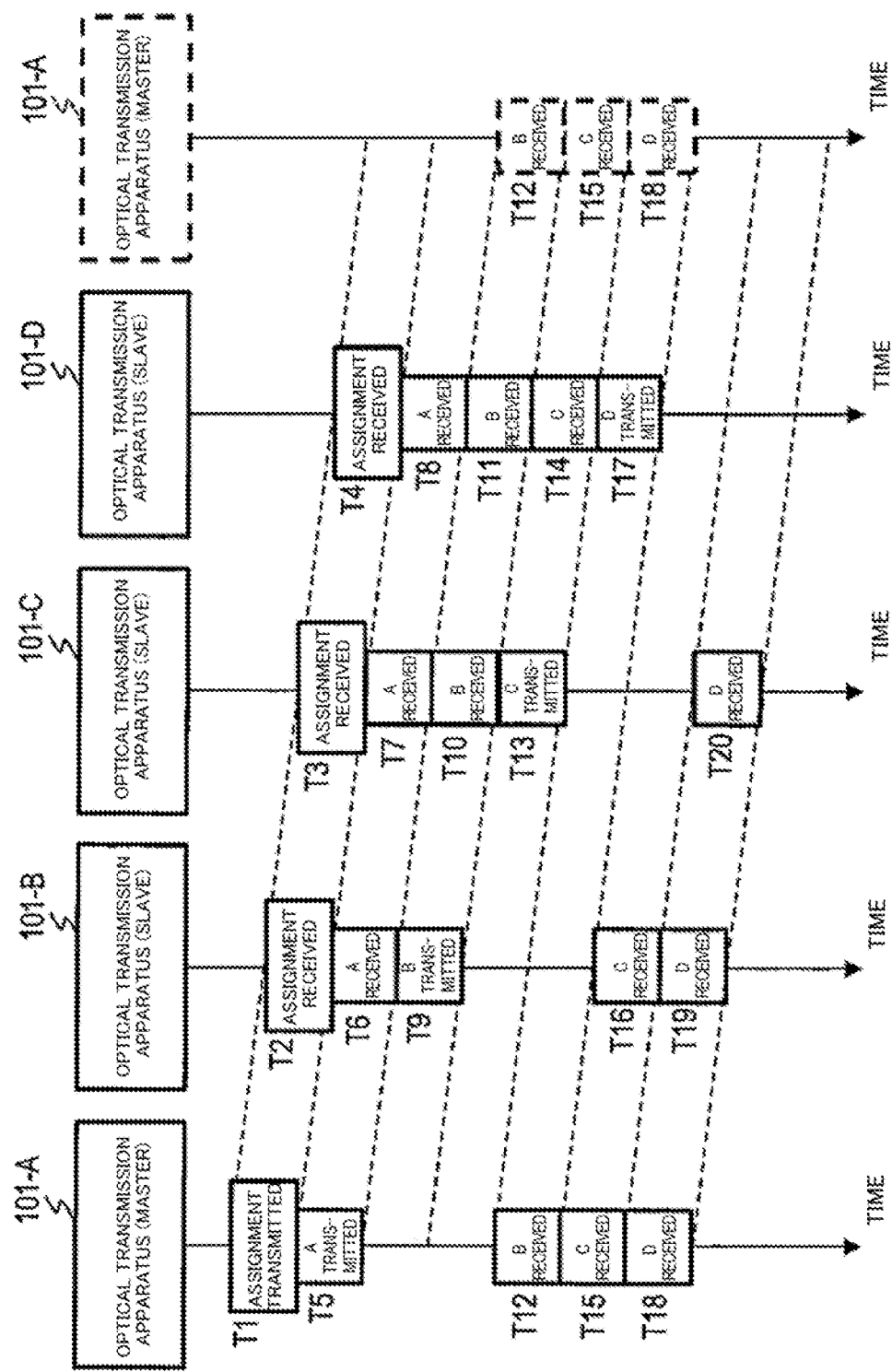
FIG. 4 illustrates an example of a data communication sequence.

FIG. 4 illustrates an example of the data communication sequence performed in the optical ring network system 100 according to the present embodiment. In FIG. 4, the vertical axis indicates time, and an optical signal is sequentially transferred from the optical transmission apparatus (master) 101-A to the optical transmission apparatus (slave) 101-B, from the optical transmission apparatus (slave) 101-B to the optical transmission apparatus (slave) 101-C, from the optical transmission apparatus (slave) 101-C to the optical transmission apparatus (slave) 101-D, and from the optical transmission apparatus (slave) 101-D to the optical transmission apparatus (master) 101-A, via the optical ring network 102.

The optical transmission apparatus (master) 101-A controls the transmission timing of optical signals transmitted by the own apparatus and the three optical transmission apparatuses (slaves), which are the optical transmission apparatuses 101-B, 101-C, and 101-D.

In FIG. 4, the optical transmission apparatus (master) 101-A transmits a control signal (referred to as an assignment signal) for assigning transmission timing to each of the optical transmission apparatuses (slaves) 101 at time point T1 (indicated as [assignment transmitted]). At time point T2, the optical transmission apparatus (slave) 101-B receives the assignment signal (indicated as [assignment received]). Likewise, at time point T3, the optical transmission apparatus (slave) 101-C receives the assignment signal, and at time point T4, the optical transmission apparatus (slave) 101-D receives the assignment signal.

The assignment signal includes information for assigning timing at which each of the optical transmission apparatus (slave) 101-B, the optical transmission apparatus (slave) 101-C, and the optical transmission apparatus (slave) 101-D transmits an optical signal (referred to as a data signal) by which communication data is transmitted. The optical transmission apparatus (master) 101-A also assigns timing for transmitting a data signal to the own apparatus. In the example in FIG. 4, the transmission timing of a data signal of the optical transmission apparatus (master) 101-A itself is assigned to T5, the transmission timing of a data signal of the optical transmission apparatus (slave) 101-B is assigned to T9, the transmission timing of a data signal of the optical transmission apparatus (slave) 101-C is assigned to T13, and the transmission timing of a data signal of the optical transmission apparatus (slave) 101-D is assigned to T17.

The optical transmission apparatus (master) 101-A assigns transmission timings of data signals to the respective optical transmission apparatuses 101 by adopting multiplexing using TDMA so that the data signals transmitted from the respective optical transmission apparatuses 101 do not collide with each other. Here, the above-described operation is described as: T1[assignment transmitted] →T2[assignment received] →T3[assignment received] →T4[assignment received], where [assignment transmitted] means transmission of the control signal for assigning transmission timing, and [assignment received] means reception of the control signal for assigning transmission timing. For example, T1[assignment transmitted] indicates that the control signal for assigning transmission timing is transmitted at time point T1, and T2[assignment received] indicates that the control signal for assigning transmission timing is received at time point T2.

Each of the optical transmission apparatuses 101 transmits a data signal to the optical ring network 102 based on the assigned transmission timing of the data signal. For example, the optical transmission apparatus (master) 101-A transmits a data signal to the optical ring network 102 at time point T5, and the transmitted data signal is sequentially received by the optical transmission apparatus (slave) 101-B at time point T6, the optical transmission apparatus (slave) 101-C at time point T7, and the optical transmission apparatus (slave) 101-D at time point T8. The above-described operation is described as: T5[A transmitted] →T6[A received] →T7[A received] →T8[A received]. Note that, similar to [assignment transmitted] or [assignment received] described above, for example, T5[A transmitted] indicates that a data signal is transmitted at time point T5, and T6[A received] indicates that the data signal is received at time point T6.

Next, the optical transmission apparatus (slave) 101-B transmits a data signal to the optical ring network 102 at time point T9, and the data signal is sequentially transmitted to the optical transmission apparatus (slave) 101-C, the optical transmission apparatus (slave) 101-D, and the optical transmission apparatus (master) 101-A, which is described as: T9[B transmitted]→T10[B received]→T11[B received]→T12[B received]. Next, a data signal transmitted by the optical transmission apparatus (slave) 101-C is sequentially transmitted as: T13[C transmitted]→T14[C received]→T15[C received]→T16[C received]. Likewise, a data signal transmitted by the optical transmission apparatus (slave) 101-D is sequentially transmitted as: T17[D transmitted]→T18[D received]→T19[D received]→120[D received].

As described above, any one of the plurality of optical transmission apparatuses 101 connected to the optical ring network 102 operates as a master apparatus, and the master apparatus performs a control operation for assigning transmission timing of a data signal to each of the other optical transmission apparatuses 101 serving as slave apparatuses. As a result, the optical ring network system 100 according to the present embodiment can perform multiplexed communication on one wavelength by optical TDMA.

Further, even when the number of optical transmission apparatuses 101 connected to the optical ring network 102 increases, the optical ring network system 100 according to the present embodiment can realize communication among all the optical transmission apparatuses 101 in the optical ring network 102 by using optical TDMA on at least one wavelength. Accordingly, the number of wavelengths needed is reduced, and even when the number of communication paths increases due to an increase in the number of optical transmission apparatuses 101 connected to the optical ring network 102, there is no need to increase the number of wavelengths, thereby solving the problem in economic efficiency in the prior art.

The data communication sequence in FIG. 4 has been described assuming that the optical transmission apparatus (master) 101-A and the three optical transmission apparatuses (slaves) 101, which are the optical transmission apparatuses (slaves) 101-B, 101-C, and 101-D, are connected to the optical ring network 102 and registered as apparatuses that use the optical ring network system 100. When an optical transmission apparatus 101 is newly connected to the optical ring network 102, an initial connection sequence to register this optical transmission apparatus 101 is executed.

For example, while the data communication sequence is executed in the optical ring network 102 to which the optical transmission apparatus (master) 101-A and at least one optical transmission apparatus (slave) 101 are connected, an initial connection sequence is executed at predetermined timing for the second or subsequent optical transmission apparatus 101 that is newly connected.

(Initial Connection Sequence (1))

Figure 5:
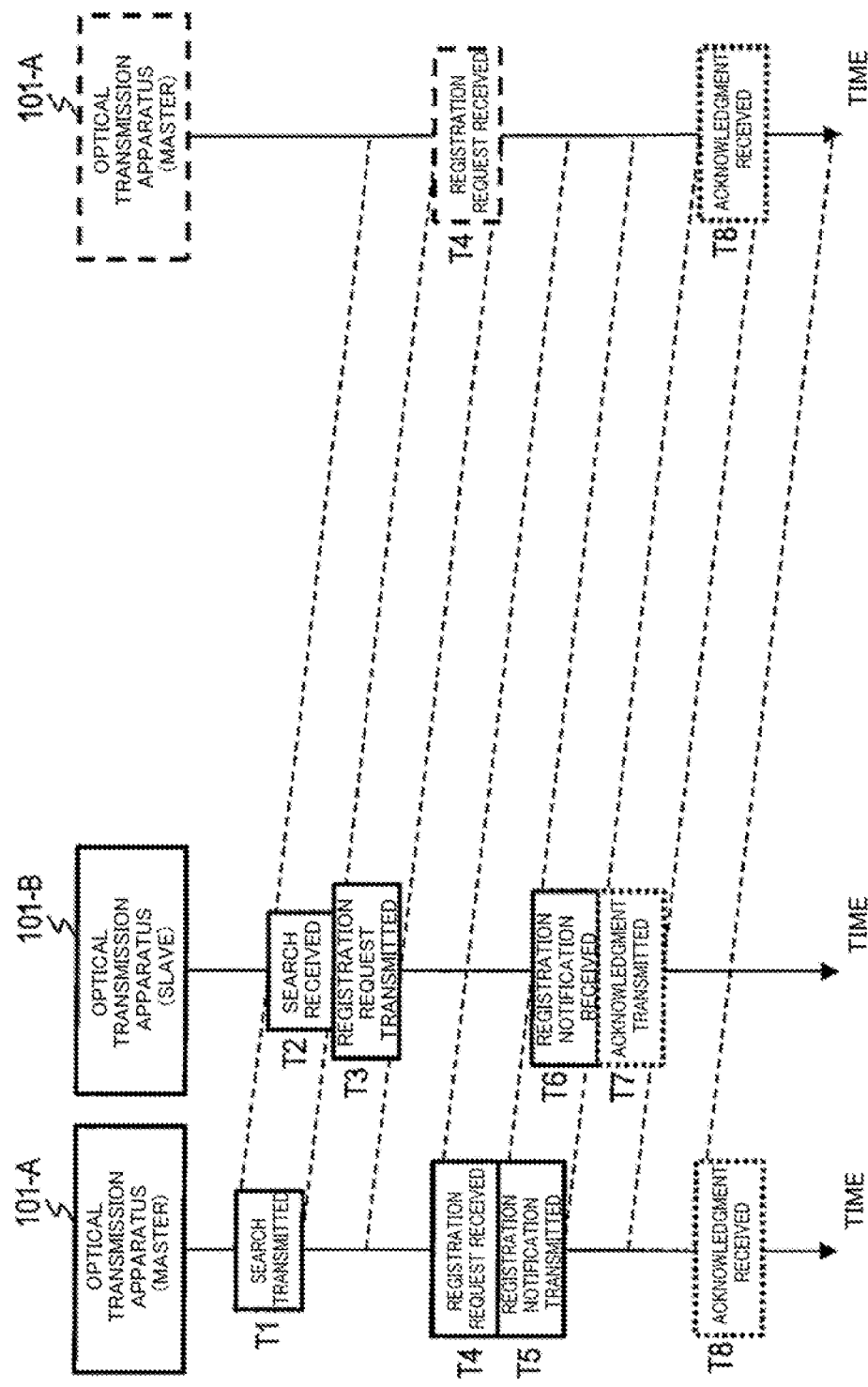
FIG. 5 illustrates an example of an initial connection sequence (only one apparatus).

FIG. 5 illustrates an example of an initial connection sequence (1) performed in the optical ring network system 100 according to the present invention. In the initial connection sequence (1), one optical transmission apparatus (slave) 101-B is initially connected to the optical ring network 102 to which the optical transmission apparatus (master) 101-A is connected. In FIG. 5, as in FIG. 4, the vertical axis indicates time, and an optical signal is sequentially transferred from the optical transmission apparatus (master) 101-A to the optical transmission apparatus (slave) 101-B and from the optical transmission apparatus (slave) 101-B to the optical transmission apparatus (master) 101-A via the optical ring network 102.

Here, one optical transmission apparatus (master) 101-A is physically connected to one optical transmission apparatus (slave) 101-B but is in a state where the optical transmission apparatus (master) 101-A does not recognize the logical connection of the optical transmission apparatus (slave) 101-B. The initial connection sequence is started from this initial state.

In the initial connection sequence, the optical transmission apparatus (master) 101-A causes the network registration master unit 213 described with reference to FIG. 2 to transmit a control signal (referred to as a search signal) for searching for an unregistered optical transmission apparatus 101 to the optical ring network 102. At this point, the optical transmission apparatus (master) 101-A provides a non-communication period (quiet window) corresponding to transmission delay time of a length of at least one round of the optical ring network 102 so as to receive a response message to the search signal.

An unregistered optical transmission apparatus (slave) 101-B that has received the search signal causes the network registration slave unit 313 described with reference to FIG. 3 to transmit a control signal (referred to as a registration request signal) for requesting registration, to the optical transmission apparatus (master) 101-A at the time point indicated in the search signal.

The optical transmission apparatus (master) 101-A that has received the registration request signal performs processing for registering the unregistered optical transmission apparatus 101 as an optical transmission apparatus 101 connected to the optical ring network system 100 and transmits a control signal (referred to as a registration notification signal) for notification of registration so as to notify the optical transmission apparatus (slave) 101-B that the registration has been completed. The registration notification signal includes time point information indicating timing for the optical transmission apparatus (slave) 101-B to transmit an acknowledgment signal.

The unregistered optical transmission apparatus (slave) 101-B confirms that the own apparatus has been registered with the optical transmission apparatus (master) 101-A upon receiving the registration notification signal. The optical transmission apparatus (slave) 101-B that has received the registration notification signal may transmit an acknowledgment signal indicating that the registration notification signal has been acknowledged to the optical transmission apparatus (master) 101-A at the time indicated in the registration notification signal.

In the example in FIG. 5, the optical transmission apparatus (master) 101-A transmits a search signal at time point T1 (indicated as [search transmitted] in FIG. 5), and the unregistered optical transmission apparatus (slave) 101-B receives the search signal at time point T2 (indicated as [search received]). The optical transmission apparatus (slave) 101-B that has received the search signal transmits a registration request signal at time point T3 ([registration request transmitted]), and the optical transmission apparatus (master) 101-A receives the registration request signal at time point T4 ([registration request received]). The optical transmission apparatus (master) 101-A that has received the registration request signal transmits a registration notification signal ([registration notification transmitted]) at time point T5, and the optical transmission apparatus (slave) 101-B receives the registration notification signal at time point T6 ([registration notification received]). When the optical transmission apparatus (slave) 101-B that has received the registration notification signal transmits an acknowledgment signal, the optical transmission apparatus (slave) 101-B may transmit an acknowledgment signal indicating that the registration notification signal has been acknowledged to the optical transmission apparatus (master) 101-A at time point T7 indicated in the registration notification signal. When the optical transmission apparatus (slave) 101-B transmits an acknowledgment signal, the optical transmission apparatus (master) 101-A receives the acknowledgment signal at time point T8.

As described above, the optical transmission apparatus (master) 101-A according to the present embodiment detects an unregistered optical transmission apparatus 101 initially connected to the optical ring network 102 by using a search signal, performs registration processing in response to reception of a registration request signal from the unregistered optical transmission apparatus 101, and transmits a registration notification signal to the unregistered optical transmission apparatus 101. In this way, the optical ring network system 100 according to the present embodiment can search for an unregistered optical transmission apparatus 101 and perform initial connection. Here, as described above in the description of the optical transmission apparatus (master) 101-A and the optical transmission apparatus (slave) 101-B, all the optical transmission apparatuses 101 that have received the search signal may return a registration request signal regardless of the presence or absence of registration.

(Initial Connection Sequence (2))

Figure 6:
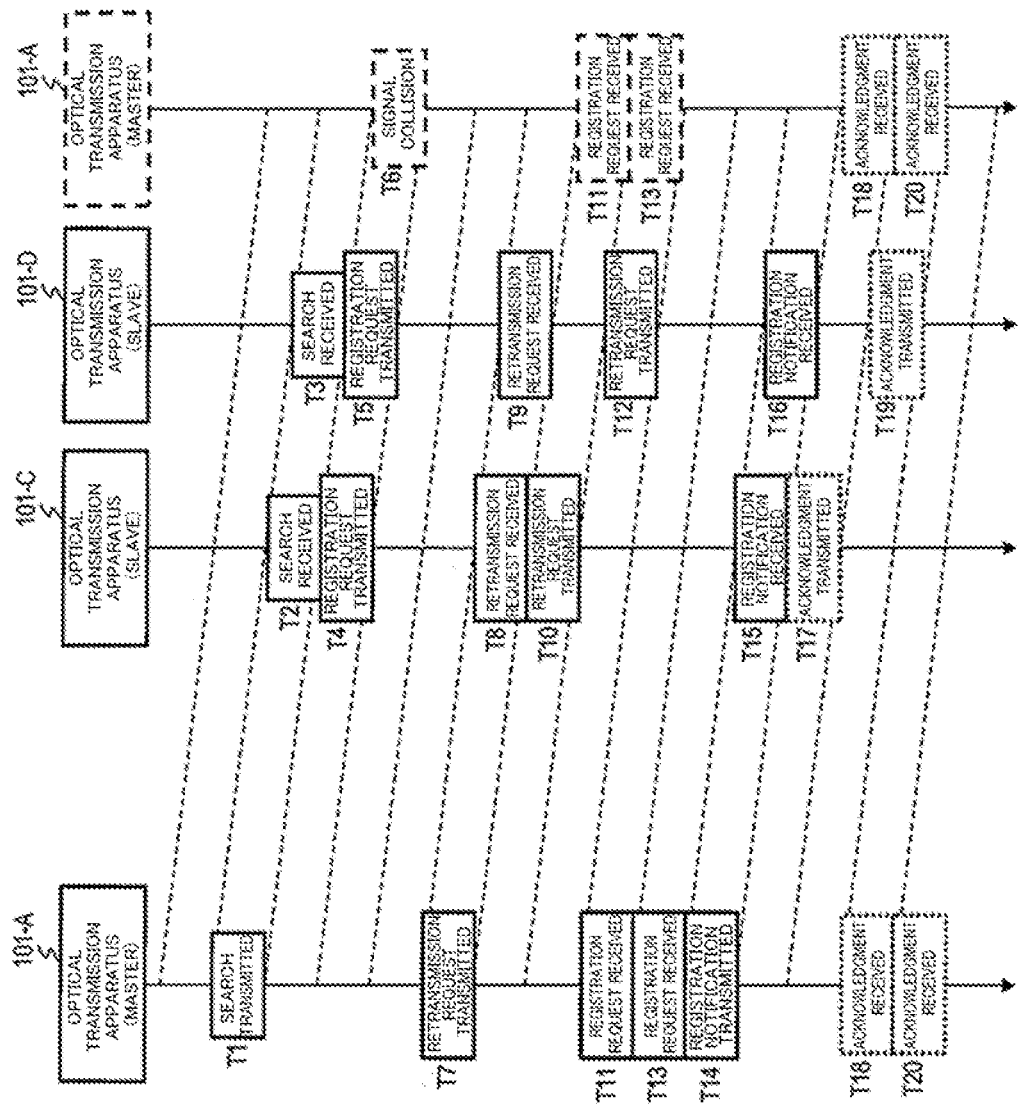
FIG. 6 illustrates an example of an initial connection sequence (two apparatuses at a time).

FIG. 6 illustrates an example of an initial connection sequence (2) performed in the optical ring network system 100 according to the present embodiment. In the initial connection sequence (2), two optical transmission apparatuses (slaves) 101, which are the optical transmission apparatus (slave) 101-C and the optical transmission apparatus (slave) 101-D, are initially connected to the optical ring network 102, to which the optical transmission apparatus (master) 101-A is connected, at a time. In FIG. 6, as in FIGS. 4 and 5, the vertical axis indicates time, and an optical signal is sequentially transferred from the optical transmission apparatus (master) 101-A to the optical transmission apparatus (slave) 101-C, from the optical transmission apparatus (slave) 101-C to the optical transmission apparatus (slave) 101-D, and from the optical transmission apparatus (slave) 101-D to the optical transmission apparatus (master) 101-A, via the optical ring network 102.

In the initial connection sequence illustrated in FIG. 6, as in FIG. 5, the optical transmission apparatus (master) 101-A transmits a search signal for searching for an unregistered optical transmission apparatus 101, and a plurality of unregistered optical transmission apparatuses 101 that has received the search signal each transmits a registration request signal for requesting registration. However, since the registration request signals are simultaneously transmitted from the plurality of unregistered optical transmission apparatuses 101, the plurality of registration request signals collides with each other [signal collision], and the optical transmission apparatus (master) 101-A cannot acknowledge the plurality of registration request signals. Thus, in the present embodiment, when detecting collision of optical signals, the optical transmission apparatus (master) 101-A transmits a control signal (referred to as a retransmission request signal) for requesting retransmission.

When the optical transmission apparatus (master) 101-A cannot properly receive optical signals, for example, an error pattern is recognized by processing of a physical coding sublayer (PCS) in the L1 unit 201 described with reference to FIG. 2, thereby enabling detection of [signal collision]. When detecting [signal collision], the optical transmission apparatus (master) 101-A causes the network registration master unit 213 to set a quiet window again and transmit a retransmission request signal to the optical ring network 102. Here, the network registration master unit 213 transmits a retransmission request signal for requesting the optical transmission apparatuses (slaves) 101 to retransmit the registration request signal at different transmission timing.

The optical transmission apparatus (slave) 101 that has received the retransmission request signal calculates a random value using a value (for example, a MAC address) unique to the own apparatus and transmits a registration request signal after a lapse of time interval corresponding to the random value, from time point specified by the retransmission request signal. The optical transmission apparatus (master) 101-A waits for the registration request signal to be transmitted at the time calculated by the optical transmission apparatus (slave) 101, not at the time specified by the retransmission request signal. Here, the optical transmission apparatus (master) 101-A shares a method or a formula by which the optical transmission apparatus (slave) 101 calculates the random value with the optical transmission apparatus (slave) 101 in advance. Next, the optical transmission apparatus (master) 101-A calculates a maximum value of the random value calculated by the optical transmission apparatus (slave) 101 by using the same method or formula as that used by the optical transmission apparatus (slave) 101 and waits for the registration request signal transmitted by the optical transmission apparatus (slave) 101 until the time interval corresponding to the maximum value elapses.

According to the above sequence, even when two or more optical transmission apparatuses (slaves) 101 are simultaneously connected to the optical ring network 102, the optical transmission apparatus (master) 101-A can receive registration request signals from all the optical transmission apparatuses (slaves) 101. The sequence after the optical transmission apparatus (master) 101-A receives the registration request signals from the plurality of optical transmission apparatuses (slaves) 101 is performed in the same manner as in the initial connection sequence (1) described with reference to FIG. 5.

In the example in FIG. 6, as in FIG. 5, the optical transmission apparatus (master) 101-A transmits a search signal at time point T1, an unregistered optical transmission apparatus (slave) 101-C receives the search signal at time point T2, and an unregistered optical transmission apparatus (slave) 101-D receives the search signal at time point T3. Next, the optical transmission apparatus (slave) 101-C transmits a registration request signal at time point T2, and the optical transmission apparatus (slave) 101-D transmits a registration request signal at time point T3.

However, since a transmission interval between the registration request signal of the optical transmission apparatus (slave) 101-C and the registration request signal of the optical transmission apparatus (slave) 101-D is less than transmission delay time corresponding to one round of the optical ring network 102, a collision between these two registration request signals occurs in the optical transmission apparatus (master) 101-A at time point T6. The optical transmission apparatus (master) 101-A that has detected the collision of the signals transmits a retransmission request signal at time point T7 (indicated as [retransmission request transmitted] in FIG. 6), the unregistered optical transmission apparatus (slave) 101-C receives the retransmission request signal at time point T8, and the unregistered optical transmission apparatus (slave) 101-D receives the retransmission request signal at time point T9. Next, the optical transmission apparatus (slave) 101-C and the optical transmission apparatus (slave) 101-D each transmit a registration request signal at a different time from each other by using the method described above. In the example in FIG. 6, the optical transmission apparatus (slave) 101-C transmits a registration request signal at time point T10, and the optical transmission apparatus (slave) 101-D transmits a registration request signal at time point T12.

Next, the optical transmission apparatus (master) 101-A receives the registration request signal from the optical transmission apparatus (slave) 101-C at time point T11 and receives the registration request signal from the optical transmission apparatus (slave) 101-D at time point T13. The optical transmission apparatus (master) 101-A that has received the registration request signals transmits a registration notification signal at time point T14, and the optical transmission apparatus (slave) 101-C and the optical transmission apparatus (slave) 101-D receive the registration notification signal at time point T15 and at time T16, respectively. The registration notification signal includes information about the plurality of optical transmission apparatuses (slaves) 101 and can notify each of the plurality of optical transmission apparatuses (slaves) 101 of the completion of registration.

As described with reference to FIG. 5, each of the optical transmission apparatuses (slaves) 101 that has received the registration notification signal may transmit, to the optical transmission apparatus (master) 101-A, an acknowledgment signal indicating that the registration notification signal has been acknowledged at the time indicated in the registration notification signal. In this case, in FIG. 6, the optical transmission apparatus (slave) 101-C transmits an acknowledgment signal at time point T17, and the optical transmission apparatus (master) 101-A receives the acknowledgment signal at time point T18. Likewise, the optical transmission apparatus (slave) 101-D transmits an acknowledgment signal at time point T19, and the optical transmission apparatus (master) 101-A receives the acknowledgment signal at time point T20. In this way, the optical transmission apparatus (master) 101-A can confirm that the optical transmission apparatus (slave) 101 has properly received the registration notification signal.

As described above, even when the two optical transmission apparatuses (slaves) 101-C and 101-D are initially connected to the optical ring network 102 at a time and the registration request signals collide with each other, the optical transmission apparatus (master) 101-A according to the present embodiment can receive the registration request signals from the plurality of unregistered optical transmission apparatuses (slaves) 101 by transmitting a retransmission request signal so that the registration processing can be performed. Here, as described above in the description of the optical transmission apparatus (master) 101-A and the optical transmission apparatus (slave) 101-B, all the optical transmission apparatuses 101 that have received the search signal may return the registration request signals regardless of the presence or absence of registration.

Second Embodiment

Figure 7:
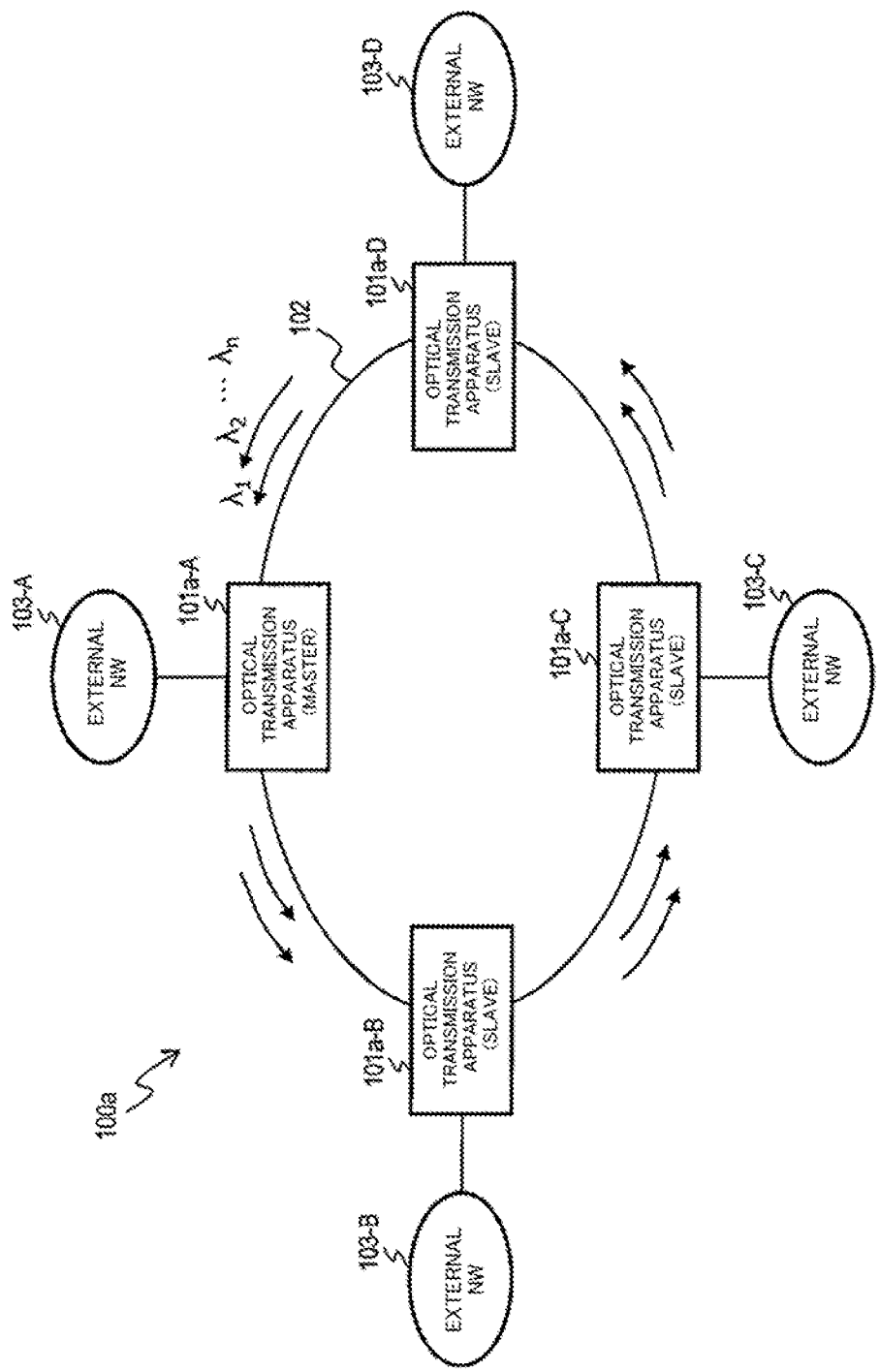
FIG. 7 illustrates an example of an optical ring network system according to a second embodiment.

FIG. 7 illustrates an optical ring network system 100a according to a second embodiment. In the optical ring network system 100 described in the first embodiment, a plurality of optical transmission apparatuses 101 performs communication on the optical ring network 102 by multiplexing an optical signal on one wavelength by using TDMA. In contrast, in the present embodiment, a plurality of optical transmission apparatuses 101a performs communication on an optical ring network 102 by transmitting optical signals on a plurality of wavelengths and by multiplexing the optical signals on each wavelength by TDMA.

In the optical ring network system 100a illustrated in FIG. 7, optical signals on n (n is a positive integer) wavelengths, for example, wavelengths $\lambda_1, \lambda_2, \ldots, \lambda_n$, are transmitted on the optical ring network 102. Thus, the optical ring network system 100a according to the present embodiment can have more communication bands than that of the optical ring network system 100 according to the first embodiment.

The data communication sequence performed at each wavelength is the same as that of the first embodiment illustrated in FIG. 4. Further, the initial connection sequence is performed only at a specific wavelength that is predetermined among the plurality of wavelengths. For example, in a case of FIG. 7, a wavelength $\lambda_1$ is determined in advance as a specific wavelength among n wavelengths, and the initial connection sequence described in the first embodiment with reference to FIGS. 5 and 6 is performed at the wavelength $\lambda_1$.

Figure 8:
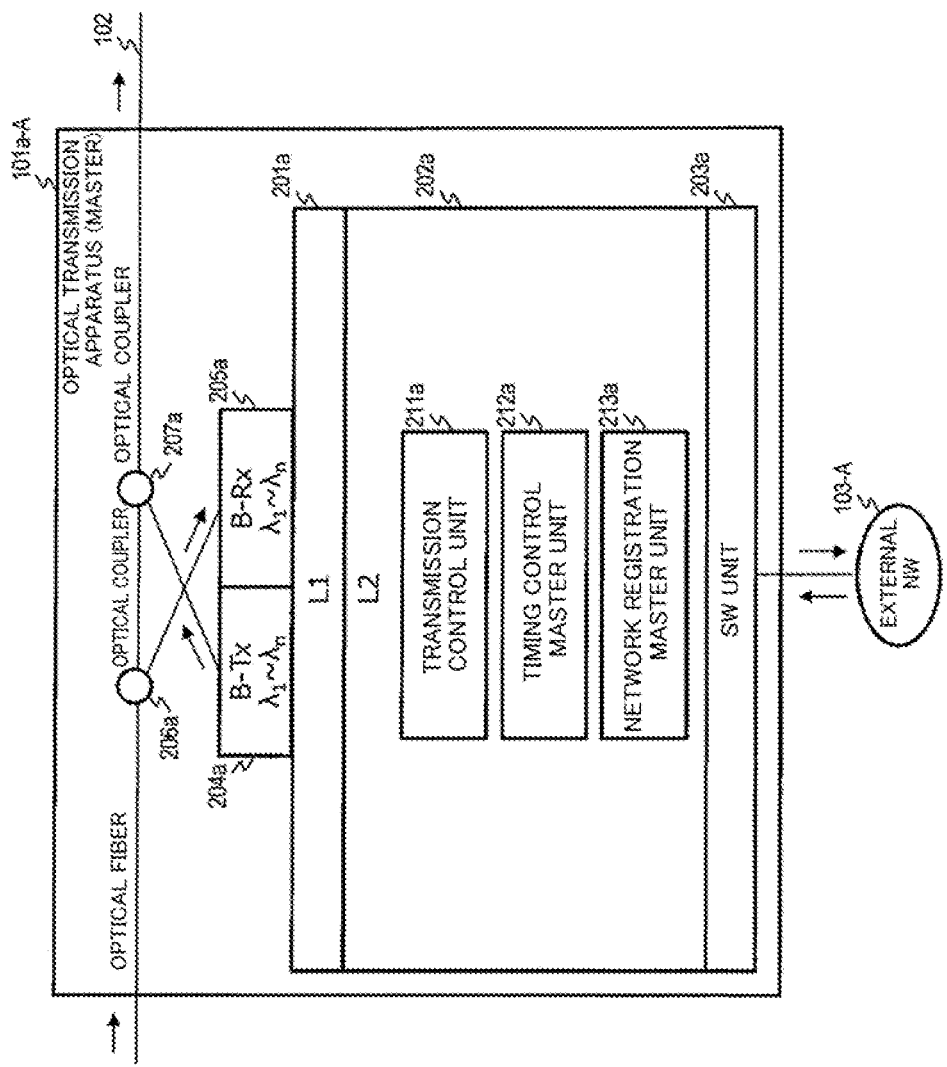
FIG. 8 illustrates an example of an optical transmission apparatus according to the second embodiment.

FIG. 8 illustrates a configuration example of an optical transmission apparatus (master) 101a-A according to the second embodiment. In FIG. 8, the optical transmission apparatus (master) 101a-A includes a layer-1 processing unit (L1 unit) 201a, a layer-2 processing unit (L2 unit) 202a, a switch unit (SW unit) 203a, an optical transmission unit (B-Tx unit) 204a, an optical reception unit (B-Rx unit) 205a, an optical coupler 206a, and an optical coupler 207a. Further, the L2 unit 202a includes a transmission control unit 211a, a timing control master unit 212a, and a network registration master unit 213a. The B-Tx unit 204a and the B-Rx unit 205a correspond to a communication unit.

In the optical transmission apparatus (master) 101a-A according to the present embodiment, the L1 unit 201a, the L2 unit 202a, the SW unit 203a, the B-Tx unit 204a, the B-Rx unit 205a, the transmission control unit 211a, the timing control master unit 212a, and the network registration master unit 213a correspond to and operate basically the same as the L1 unit 201, the L2 unit 202, the SW unit 203, the B-Tx unit 204, the B-Rx unit 205, the transmission control unit 211, the timing control master unit 212, and the network registration master unit 213 of the optical transmission apparatus (master) 101-A described in the first embodiment with reference to FIG. 2, respectively. The present embodiment differs from the first embodiment in that an individual block performs the processing described in the first embodiment on each of the plurality of wavelengths so as to cope with the plurality of wavelengths.

For example, in FIG. 8, the L1 unit 201a and the L2 unit 202a perform processing of the first layer and the second layer of the OSI reference model on each of the plurality of wavelengths, and the SW unit 203a performs transfer of packets transmitted at the plurality of wavelengths between the L2 unit 202a and an external NW 103.

Further, in FIG. 8, the B-Tx unit 204a is a transmission unit that intermittently outputs optical signals on the plurality of wavelengths $\lambda_1$ to $\lambda_n$. In response to an instruction from the transmission control unit 211a, the B-Tx unit 204a transmits signals transferred from the L1 unit 201a as optical signals in a burst manner to the optical fiber constituting the optical ring network 102 via the optical coupler 207a. The B-Rx unit 205a is a reception unit that receives, per wavelength, intermittent optical signals on the plurality of wavelengths $\lambda_1$ to $\lambda_n$. The B-Rx unit 205a receives optical signals on the plurality of wavelengths in a burst manner from the optical fiber constituting the optical ring network 102 via the optical coupler 206a and transfers, per wavelength, the received signals to the L1 unit 201a.

Further, in the L2 unit 202a, the transmission control unit 211a instructs the B-Tx unit 204a to transmit optical signals per wavelength, in a similar manner that the transmission control unit 211 does in FIG. 2.

The timing control master unit 212a determines, for each wavelength, transmission timing of all the optical transmission apparatuses 101a connected to the optical ring network 102 including its own apparatus and provides instructions for each wavelength about time point to transmit and how long to transmit the optical signal, to the transmission control unit 211a of its own apparatus (or the optical transmission apparatus (slave) 101a).

The network registration master unit 213a performs an initial connection sequence with the optical transmission apparatus (slave) 101a to detect connection of an unregistered optical transmission apparatus (slave) 101a to the optical ring network 102 and register the unregistered optical transmission apparatus (slave) 101a with the optical ring network system 100a. Specifically, the network registration master unit 213a transmits a search signal at a predetermined specific wavelength (for example, to search for an unregistered optical transmission apparatus 101a that is newly connected. When receiving a registration request signal transmitted at the same specific wavelength as that of the search signal, from an optical transmission apparatus (slave) 101a that has responded to the search signal, the network registration master unit 213a performs registration processing for registering the optical transmission apparatus (slave) 101a as an apparatus connected to the optical ring network 102 and transmits a registration notification signal to this optical transmission apparatus (slave) 101a at the same specific wavelength as that of the search signal.

In this way, the optical transmission apparatus (master) 101a-A according to the second embodiment registers an optical transmission apparatus (slave) 101a and also performs processing for assigning, for each wavelength, timing at which the registered optical transmission apparatus (slave) 101a transmits an optical signal to the optical ring network 102. Accordingly, all the optical transmission apparatuses 101a in the optical ring network 102 can perform communication by multiplexing the optical signals on each wavelength by optical TDMA. As a result, the communication band increases, compared to the case where only wavelength-multiplexing is performed. Further, even when the number of communication paths increases due to an increase in the number of optical transmission apparatuses 101a connected to the optical ring network 102, there is no need to increase the number of wavelengths, thereby solving the problem in economic efficiency in the prior art.

Third Embodiment

Figure 9:
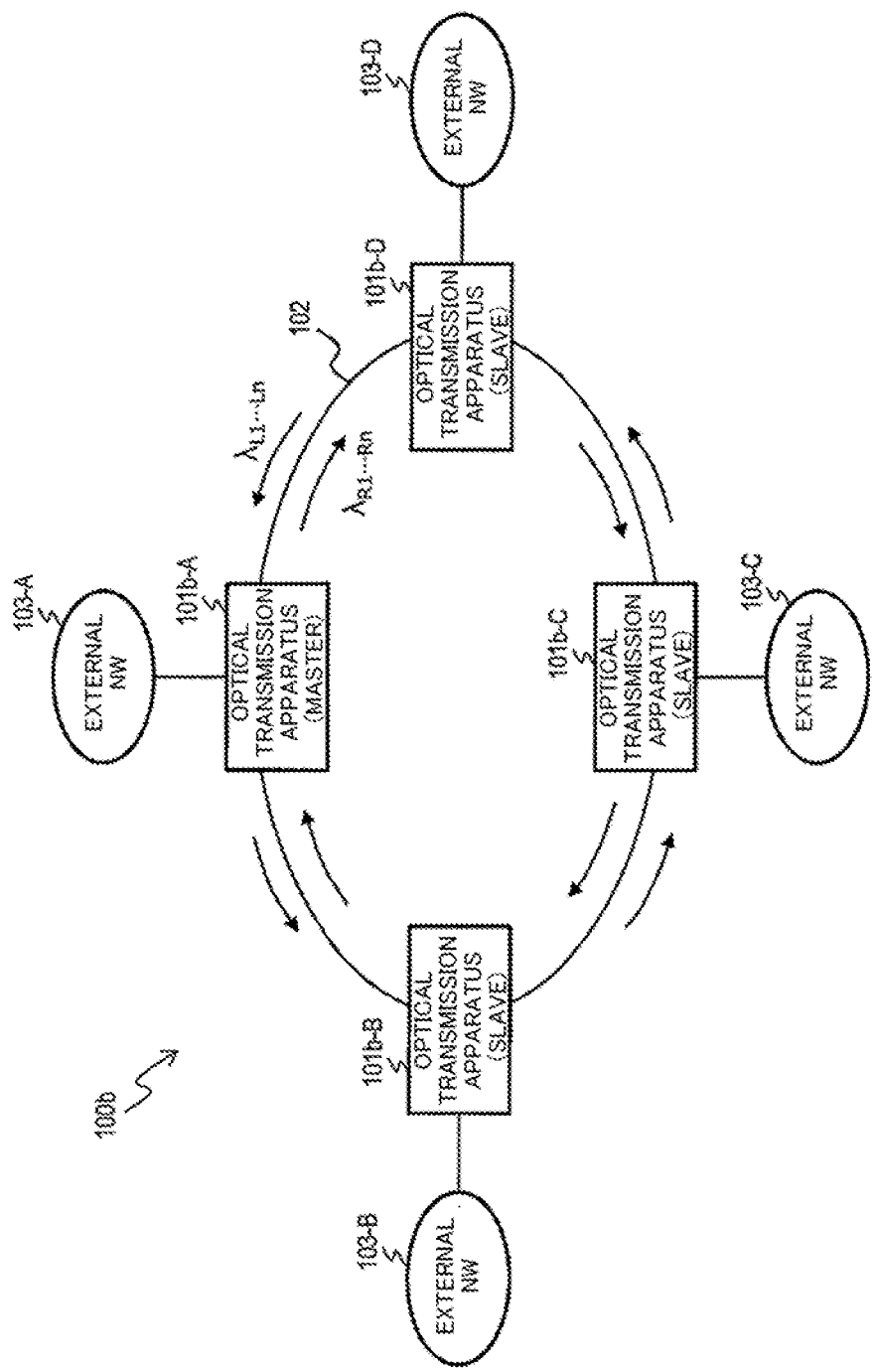
FIG. 9 illustrates an example of an optical ring network system according to a third embodiment.

FIG. 9 illustrates an optical ring network system 100b according to the third embodiment. In the optical ring network system 100 described in the first embodiment, a plurality of optical transmission apparatuses 101 performs communication by multiplexing the optical signal on one wavelength by TDMA in the same direction (counterclockwise in FIG. 1) on the optical ring network 102. Further, in the second embodiment, a plurality of optical transmission apparatuses 101a performs communication by transmitting optical signals on a plurality of wavelengths in the same direction (counterclockwise in FIG. 7) on the optical ring network 102 and by multiplexing the optical signals on each wavelength by TDMA.

In the third embodiment, a plurality of optical transmission apparatuses 101b performs communication by transmitting optical signals on a plurality of wavelengths bidirectionally (clockwise and counterclockwise in FIG. 9) on an optical ring network 102 and by multiplexing the optical signals on each wavelength by TDMA. In this way, the optical ring network system 100b according to the third embodiment can increase the communication band more than that of the optical ring network system 100a according to the second embodiment.

In the optical ring network system 100b illustrated in FIG. 9, for example, optical signals on n wavelengths $\lambda_{L1}$, $\lambda_{L2}$, ..., $\lambda_{Ln}$ are transmitted counterclockwise on the optical ring network 102, and optical signals on n wavelengths $\lambda_{R1}$, $\lambda_{R2}$, ..., $\lambda_{Rn}$ are transmitted clockwise on the optical ring network 102. In this way, the optical ring network system 100b according to the present embodiment can increase the communication band more than that of the optical ring network system 100 according to the first embodiment and the optical ring network system 100a according to the second embodiment.

The data communication sequence at each wavelength in each direction is the same as that in the first embodiment illustrated in FIG. 4. In addition, the initial connection sequence is performed only for a specific wavelength in any predetermined direction among a plurality of wavelengths in each direction. For example, in the case of FIG. 9, the wavelength $\lambda_1$ among the n wavelengths in the counterclockwise direction is predetermined as a specific wavelength, and the initial connection sequence described in the first embodiment with reference to FIGS. 5 and 6 is performed at the wavelength $\lambda_1$ in the counterclockwise direction.

Figure 10:
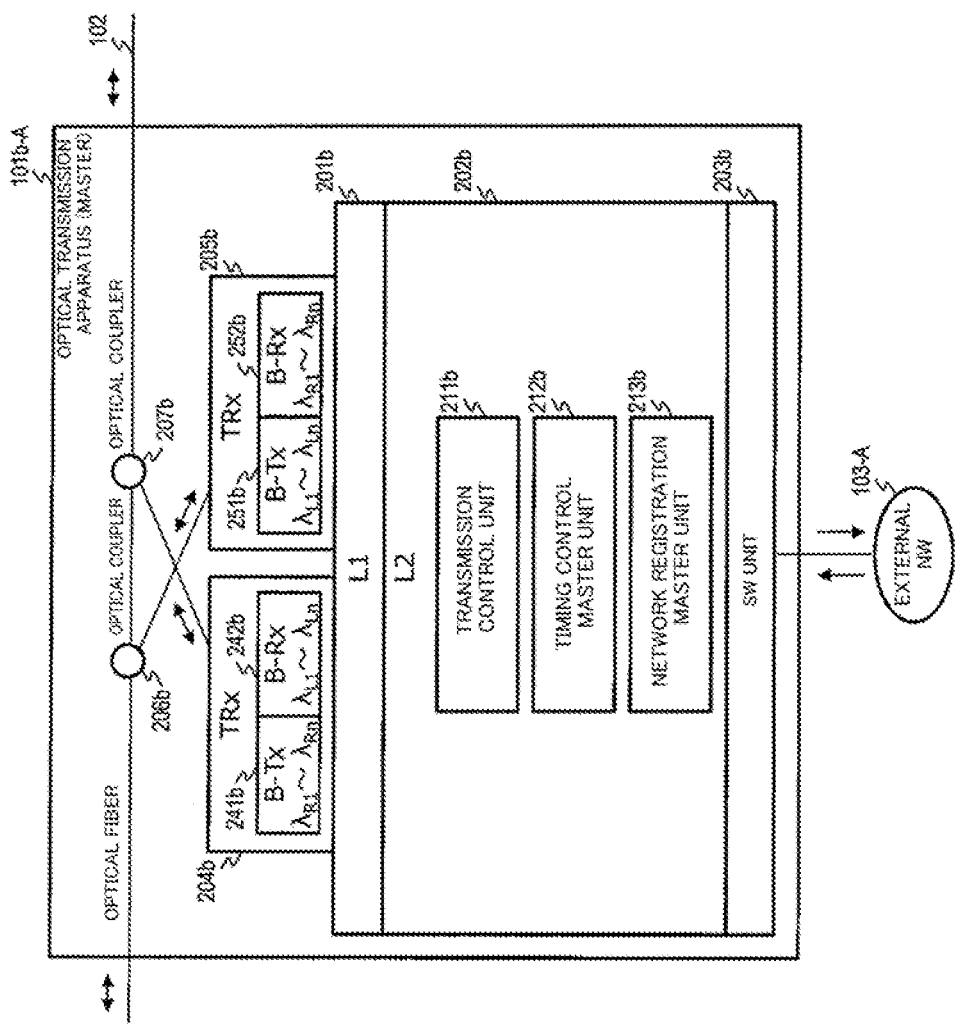
FIG. 10 illustrates an example of an optical transmission apparatus according to the third embodiment.
Figure 11:
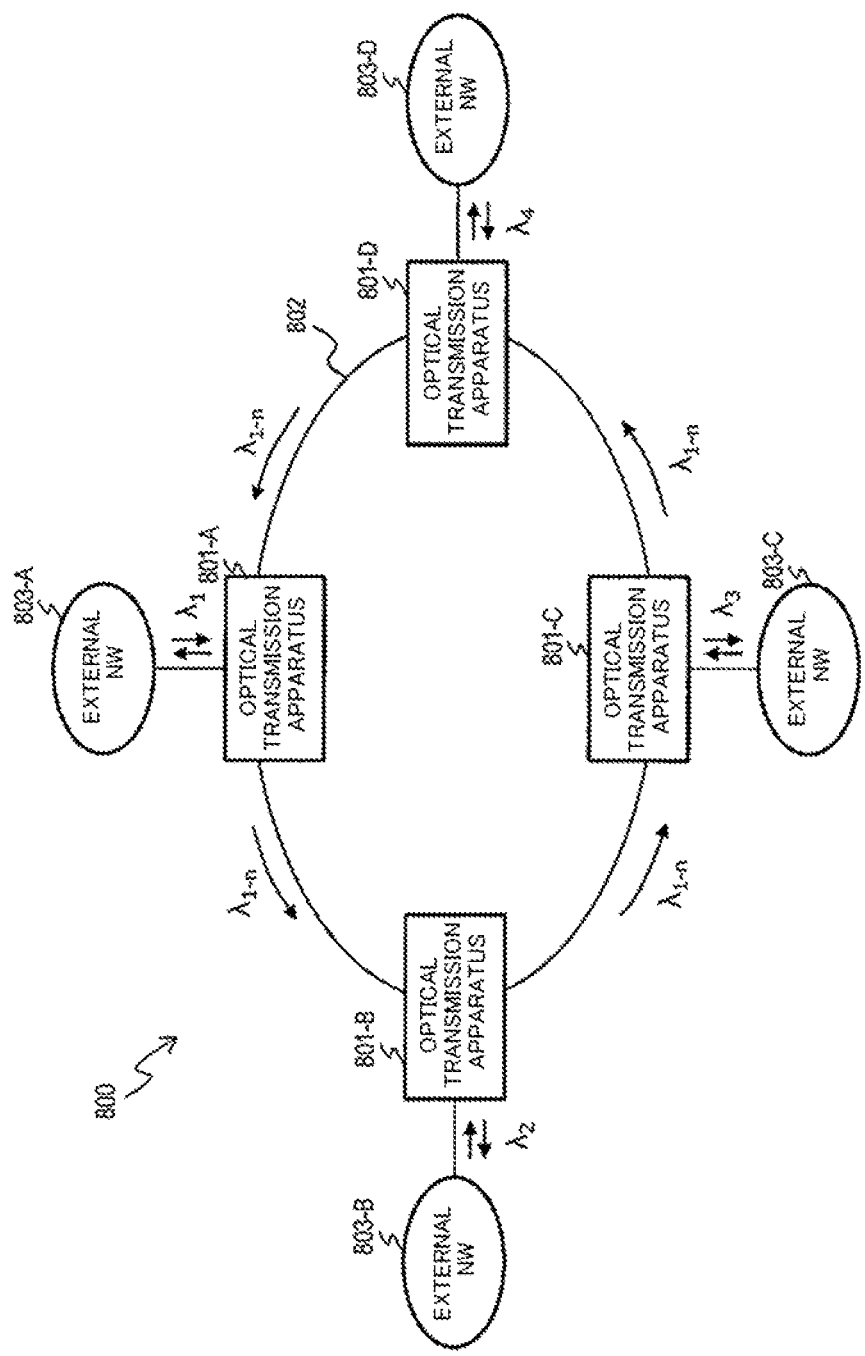
FIG. 11 illustrates an example of a conventional optical ring network system.
Figure 12:
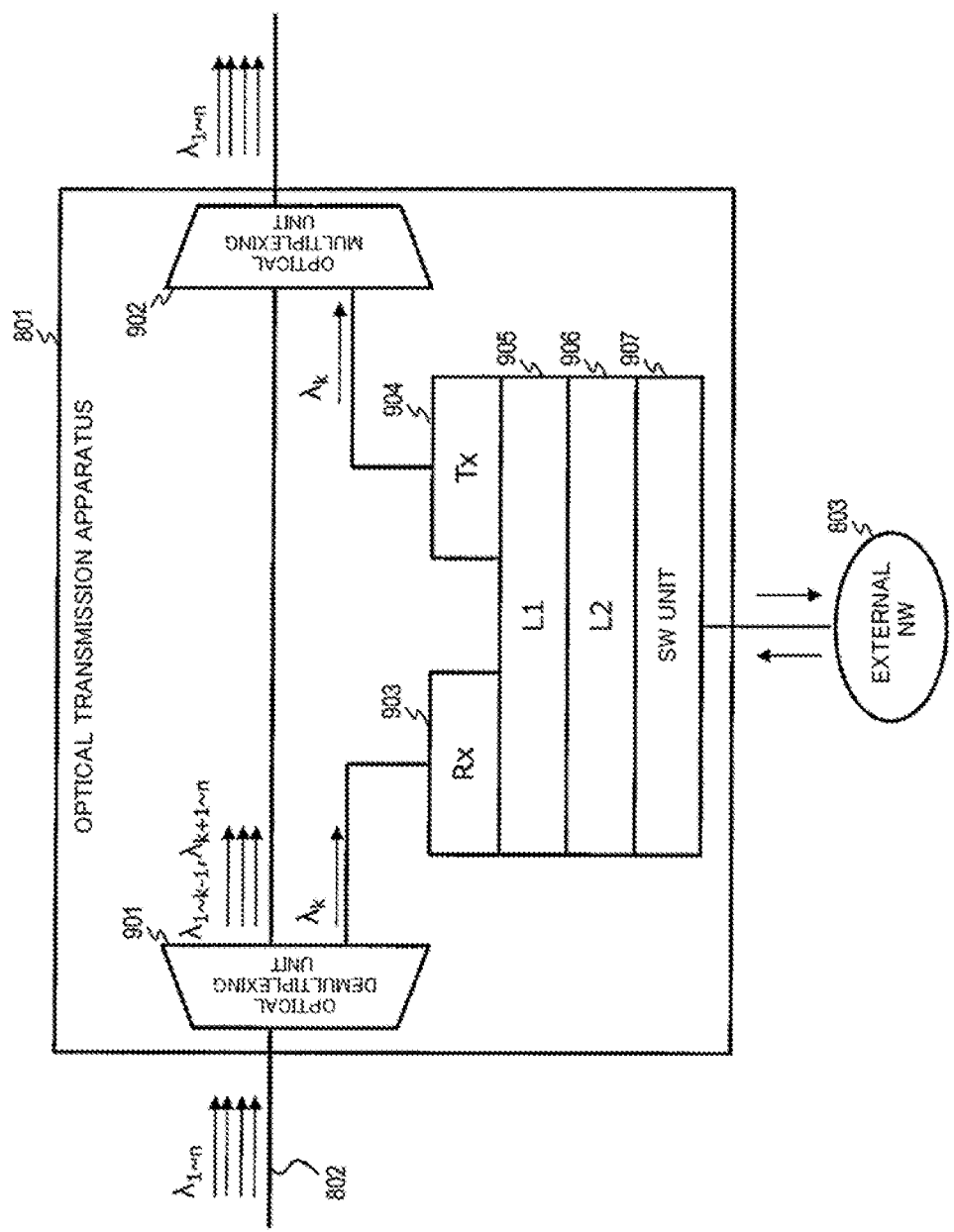
FIG. 12 illustrates an example of a conventional optical transmission apparatus.

FIG. 10 illustrates a configuration example of an optical transmission apparatus (master) 101b-A according to the third embodiment. In FIG. 10, the optical transmission apparatus (master) 101b-A includes a layer-1 processing unit (L1 unit) 201b, a layer-2 processing unit (L2 unit) 202b, a switch unit (SW unit) 203b, an optical transmission/reception unit (TRx unit) 204b, an optical transmission/reception unit (TRx unit) 205b, an optical coupler 206b, and an optical coupler 207b. Further, the L2 unit 202b includes a transmission control unit 211b, a timing control master unit 212b, and a network registration master unit 213b.

In the optical transmission apparatus (master) 101b-A according to the third embodiment, the basic operations of the L1 unit 201b, the L2 unit 202b, the SW unit 203b, the transmission control unit 211b, the timing control master unit 212b, and the network registration master unit 213b are the same as those of the blocks denoted by the same names of the optical transmission apparatus (master) 101a-A described in the second embodiment with reference to FIG. 8. The present embodiment differs from the second embodiment in that, to transmit optical signals on a plurality of wavelengths in the clockwise direction and the counterclockwise direction, the TRx unit 204b and the TRx unit 205b are provided in place of the B-Tx unit 204a and the B-Rx unit 205a of the second embodiment. The TRx unit 204b and the TRx unit 205b correspond to a communication unit.

The TRx unit 204b includes a B-Tx unit 241b and a B-Rx unit 242b. The B-Tx unit 241b is a transmission unit that intermittently outputs optical signals on the plurality of wavelengths $\lambda_{R1}$ to $\lambda_{Rn}$ in the clockwise direction. In response to an instruction from the transmission control unit 211b, the B-Tx unit 241b transmits, per wavelength, signals transferred from the L1 unit 201b as optical signals in a burst manner to the optical fiber constituting the optical ring network 102 via the optical coupler 207b. The B-Rx unit 242b is a reception unit that receives, per wavelength, intermittent optical signals on the plurality of wavelengths $\lambda_{L1}$ to $\lambda_{Ln}$ in the counterclockwise direction. The B-Rx unit 242b receives optical signals on the plurality of wavelengths in a burst manner from the optical fiber constituting the optical ring network 102 via the optical coupler 207b and transfers, per wavelength, the received signals to the L1 unit 201b.

The TRx unit 205b includes a B-Tx unit 251b and a B-Rx unit 252b. The B-Tx unit 251b is a transmission unit that intermittently outputs optical signals on the plurality of wavelengths $\lambda_{L1}$ to $\lambda_{Ln}$ in the counterclockwise direction. In response to an instruction from the transmission control unit 211b, the B-Tx unit 251b transmits, per wavelength, signals transferred from the L1 unit 201b as optical signals in a burst manner to the optical fiber constituting the optical ring network 102 via the optical coupler 206b. The B-Rx unit 252b is a reception unit that receives, per wavelength, intermittent optical signals on the plurality of wavelengths $\lambda_{R1}$ to $\lambda_{Rn}$ in the clockwise direction. The B-Rx unit 252b receives optical signals on the plurality of wavelengths in a burst manner from the optical fiber constituting the optical ring network 102 via the optical coupler 206b and transfers, per wavelength, the received signals to the L1 unit 201b.

Further, in the L2 unit 202b, the transmission control unit 211b controls transmission of optical signals in a similar manner that the transmission control unit 211a in FIG. 8 does. However, in the present embodiment, the transmission control unit 211b instructs the B-Tx unit 241b to transmit optical signals in the clockwise direction and instructs the B-Tx unit 251b to transmit optical signals in the counterclockwise direction per wavelength.

The timing control master unit 212b determines, for each wavelength, respective transmission timings in the clockwise direction and the counterclockwise direction for all the optical transmission apparatuses 101b connected to the optical ring network 102 including its own apparatus. Further, the timing control master unit 212b provides instructions for each wavelength about time point to transmit and how long to transmit the optical signal in each of the clockwise direction and the counterclockwise direction, to the transmission control unit 211b of its own apparatus (or the optical transmission apparatus (slave) 101b).

The network registration master unit 213b performs an initial connection sequence with the optical transmission apparatus (slave) 101b to detect connection of an unregistered optical transmission apparatus (slave) 101b to the optical ring network 102 and register the unregistered optical transmission apparatus (slave) 101b with the optical ring network system 100b. Specifically, the network registration master unit 213b transmits a search signal at a predetermined specific wavelength (for example, in a predetermined clockwise direction or counterclockwise direction, to search for an unregistered optical transmission apparatus 101b that is newly connected. When receiving a registration request signal transmitted in the same direction and at the same specific wavelength as that of the search signal, from an optical transmission apparatus (slave) 101b that has responded to the search signal, the network registration master unit 213b performs registration processing for registering the optical transmission apparatus (slave) 101b as an apparatus connected to the optical ring network 102 and transmits a registration notification signal to this optical transmission apparatus (slave) 101b in the same direction and at the same specific wavelength as that of the search signal.

In this way, the optical transmission apparatus (master) 101b-A according to the third embodiment registers an optical transmission apparatus (slave) 101b and also performs processing for assigning, for each wavelength, timing at which the registered optical transmission apparatus (slave) 101b transmits an optical signal in each of the clockwise direction and the counterclockwise direction of the optical ring network 102. Accordingly, all the optical transmission apparatuses 101b in the optical ring network 102 can perform communication by multiplexing the optical signals on each wavelength by optical TDMA in each of the clockwise direction and the counterclockwise direction. As a result, the communication band increases more than the cases, for example, where only wavelength-multiplexing is performed, where optical TDMA is performed on a single wavelength in a single direction, or where optical TDMA is performed on a plurality of wavelengths in a single direction. Further, even when the number of communication paths increases due to an increase in the number of optical transmission apparatuses 101b connected to the optical ring network 102, there is no need to increase the number of wavelengths in each direction, thereby solving the problem in economic efficiency in the prior art.

[Redundancy Examples]

In the second and third embodiments described above, since a plurality of wavelengths is used, communication can be made redundant. The following two methods can be considered as redundancy methods.

(1) 1+1 Redundancy

Even when a failure occurs on any different wavelength performing different communication, communication can be continued on another wavelength where no failure occurs.

(2) 1:1 Redundancy

Even when a failure occurs on a wavelength where communication is being performed, communication can be started using a wavelength where communication is not being performed as a communication path of a redundant system. The initial connection sequence and the data communication sequence are the same as those in the first embodiment.

As described above, in the second and third embodiments, since all the optical transmission apparatuses 101a or all the optical transmission apparatuses 101b can perform communication using a plurality of wavelengths, 1+1 redundancy or 1:1 redundancy can be achieved, and the reliability of communication can thus be improved.

In the case of the third embodiment, since optical signals on a plurality of wavelengths are transmitted in each of the clockwise direction and the counterclockwise direction of the optical ring network 102, for example, even when a failure occurs in communication in the clockwise direction, redundancy of communication can be achieved in the counterclockwise direction.

A program corresponding to the processing performed by each unit described with reference to FIG. 2, FIG. 3, FIG. 8, and FIG. 10 may be executed by a computer or an integrated circuit. In addition, the program may be recorded in a storage medium to be provided or may be provided through a network.

As described in the above embodiments, the communication apparatus, the communication method, the communication system, and the communication program according to the present invention can perform communication among all optical transmission apparatuses in an optical ring network by optical TDMA on at least one wavelength. As a result, the number of wavelengths needed for communication is reduced, and even when the number of communication paths increases due to an increase in the number of optical transmission apparatuses 101 connected to the optical ring network 102, there is no need to increase the number of wavelengths, thereby solving the problem in economic efficiency in the prior art.

REFERENCE SIGNS LIST 100, 100a, 100b, 800 Optical ring network system
101, 101a, 101b, 801 Optical transmission apparatus
102, 802 Optical ring network
103, 103a, 103b, 803 External NW
201, 201a, 201b, 905 L1 unit 202, 202a, 202b, 906 L2 unit
203, 203a, 203b, 907 SW unit
204, 204a, 241b, 251b B-Tx unit
204b, 205b TRx unit
205, 205a, 242b, 252b B-Rx unit
206, 206a, 206b Optical coupler
207, 207a, 207b Optical coupler
211, 211a, 211b Transmission control unit
212, 212a, 212b Timing control master unit
213, 213a, 213b Network registration master unit
311 Transmission control unit
312 Timing control slave unit
313 Network registration slave unit
901 Optical demultiplexing unit
902 Optical multiplexing unit
903 Rx
904 Tx

The invention claimed is:

1. A communication method used in a communication system in which a plurality of communication apparatuses is connected by an optical ring network, the communication method comprising:
setting one of the plurality of communication apparatuses as a master communication apparatus and other communication apparatuses of plurality of communication apparatuses as slave communication apparatuses,
causing the master communication apparatus to transmit an optical signal at transmission timing determined in the master communication apparatus;
causing the master communication apparatus to transmit an assignment signal for assigning, to the slave communication apparatuses, transmission timing at which an optical signal on at least one wavelength is time-division multiplexed and transmitted; and
causing one of the slave communication apparatuses to transmit an optical signal to the optical ring network based on the transmission timing assigned by the assignment signal from the master communication apparatus, wherein
the master communication apparatus provides a quiet window corresponding to transmission delay time of a length of at least one round of the optical ring network and transmits a search signal for searching for another slave communication apparatus that is unregistered,
when receiving a registration request signal from the another slave communication apparatus, the master communication apparatus performs processing for registering the another slave communication apparatus, and
when receiving the search signal from the master communication apparatus, the another slave communication apparatus transmits the registration request signal for requesting registration to the master communication apparatus.

2. The communication method according to claim 1, wherein
the search signal includes a first time point for the another slave communication apparatus, and
the another slave communication apparatus transmits the registration request signal at the first time point indicated in the search signal to the master communication apparatus.

3. The communication method according to claim 1, wherein
after the another slave communication apparatus is registered, the master communication apparatus transmits a registration notification signal to the another slave communication apparatus,
the registration notification signal includes a second time point for the another slave communication apparatus,
when receiving the registration notification signal, the another slave communication apparatus confirms that the another slave communication apparatus has been registered and transmits an acknowledgment signal to the master communication apparatus at the second time point indicated in the registration notification signal, and
the acknowledgment signal indicates that the registration notification signal has been acknowledged by the another slave communication apparatus.

4. A communication apparatus comprising:
a communication unit configured to be connected to an optical ring network and transmit or receive an optical signal via the optical ring network; and
a control unit configured to control transmission timing of an optical signal, wherein
when the communication apparatus itself is a master communication apparatus, the control unit transmits an optical signal at transmission timing determined in the communication apparatus itself and transmits, from the communication unit to the optical ring network, an assignment signal for assigning transmission timing at which an optical signal on at least one wavelength is time-division multiplexed and transmitted, to other communication apparatuses serving as slave communication apparatuses connected to the optical ring network,
when the communication apparatus itself is one of the slave communication apparatuses, the control unit transmits an optical signal from the communication unit to the optical ring network, based on the transmission timing assigned by the assignment signal from the master communication apparatus,
when the communication apparatus itself is the master communication apparatus, the control unit provides a quiet window corresponding to transmission delay time of a length of at least one round of the optical ring network and transmits, from the communication unit to the optical ring network, a search signal for searching for another slave communication apparatus that is unregistered, and when the communication unit receives a registration request signal from the another slave communication apparatus via the optical ring network, the control unit performs processing for registering the another slave communication apparatus, and
when the communication apparatus itself is one of the slave communication apparatuses, the control unit transmits, from the communication unit to the optical ring network, the registration request signal for requesting registration with the optical ring network, based on the search signal from the master communication apparatus.

5. A non-transitory computer-readable medium storing a communication program for causing a computer or an integrated circuit to execute processing performed by the control unit of the communication apparatus according to claim 4.

6. The communication apparatus according to claim 4, wherein
the search signal includes a first time point for the another slave communication apparatus, and
when the communication apparatus itself is the master communication apparatus, the another slave communication apparatus transmits the registration request signal at the first time point indicated in the search signal to the master communication apparatus.

7. The communication apparatus according to claim 4, wherein
when the communication apparatus itself is the master communication apparatus:
after the another slave communication apparatus is registered, the master communication apparatus transmits a registration notification signal to the another slave communication apparatus;
the registration notification signal includes a second time point for the another slave communication apparatus;
when receiving the registration notification signal, the another slave communication apparatus confirms that the another slave communication apparatus has been registered and transmits an acknowledgment signal to the master communication apparatus at the second time point indicated in the registration notification signal; and
the acknowledgment signal indicates that the registration notification signal has been acknowledged by the another slave communication apparatus.

8. A communication system in which a plurality of communication apparatuses is connected by an optical ring network, the communication system comprising:
a master communication apparatus as one of the plurality of communication apparatuses; and
other communication apparatuses of the plurality of communication apparatuses as slave communication apparatuses, wherein
the master communication apparatus transmits an optical signal at transmission timing determined in the master communication apparatus and transmits an assignment signal for assigning, to the slave communication apparatuses, transmission timing at which an optical signal on at least one wavelength is time-division multiplexed and transmitted, and,
one of the slave communication apparatuses transmits an optical signal to the optical ring network, based on the transmission timing assigned by the assignment signal from the master communication apparatus,
the master communication apparatus provides a quiet window corresponding to transmission delay time for a length of at least one round of the optical ring network and transmits a search signal for searching for another slave communication apparatus that is unregistered,
when receiving a registration request signal from the another slave communication apparatus, the master communication apparatus performs processing for registering the another slave communication apparatus, and
when receiving the search signal from the master communication apparatus, the another slave communication apparatus transmits the registration request signal for requesting registration to the master communication apparatus.

9. The communication system according to claim 8, wherein
the search signal includes a first time point for the another slave communication apparatus, and
the another slave communication apparatus transmits the registration request signal at the first time point indicated in the search signal to the master communication apparatus.

10. The communication system according to claim 8, wherein
after the another slave communication apparatus is registered, the master communication apparatus transmits a registration notification signal to the another slave communication apparatus,
the registration notification signal includes a second time point for the another slave communication apparatus,
when receiving the registration notification signal, the another slave communication apparatus confirms that the another slave communication apparatus has been registered and transmits an acknowledgment signal to the master communication apparatus at the second time point indicated in the registration notification signal, and
the acknowledgment signal indicates that the registration notification signal has been acknowledged by the another slave communication apparatus.

* * * * *